United States Patent
Tonooka et al.

(10) Patent No.: US 9,058,831 B2
(45) Date of Patent: Jun. 16, 2015

(54) PERPENDICULAR MAGNETIC RECORDING MEDIUM WITH GRAIN BOUNDARY CONTROLLING LAYERS

(75) Inventors: Shun Tonooka, Kanagawa (JP); Kiwamu Tanahashi, Tokyo (JP); Hiroyuki Nakagawa, Kanagawa (JP); Ichiro Tamai, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 446 days.

(21) Appl. No.: 13/326,213

(22) Filed: Dec. 14, 2011

(65) Prior Publication Data

US 2013/0155542 A1    Jun. 20, 2013

(51) Int. Cl.
G11B 5/66    (2006.01)
G11B 5/65    (2006.01)
G11B 5/851   (2006.01)

(52) U.S. Cl.
CPC .. G11B 5/65 (2013.01); G11B 5/66 (2013.01); G11B 5/851 (2013.01)

(58) Field of Classification Search
None
See application file for complete search history.

(56) References Cited

U.S. PATENT DOCUMENTS

| | | | |
|---|---|---|---|
| 6,174,597 B1* | 1/2001 | Yusu et al. | 428/332 |
| 7,470,474 B2 | 12/2008 | Sakawaki et al. | |
| 7,582,368 B2 | 9/2009 | Berger et al. | |
| 7,846,564 B2 | 12/2010 | Li et al. | |
| 7,901,801 B2 | 3/2011 | Oikawa et al. | |
| 7,976,965 B2 | 7/2011 | Shimizu et al. | |
| 2008/0113221 A1* | 5/2008 | Hirayama et al. | 428/810 |
| 2010/0067149 A1 | 3/2010 | Bian et al. | |
| 2010/0110577 A1* | 5/2010 | Weller et al. | 360/59 |
| 2010/0159286 A1 | 6/2010 | Singh et al. | |
| 2010/0247963 A1 | 9/2010 | Kim et al. | |

(Continued)

FOREIGN PATENT DOCUMENTS

| | | |
|---|---|---|
| JP | 2001/023144 | 1/2001 |
| JP | 2003/091808 A | 3/2003 |

(Continued)

OTHER PUBLICATIONS

Nolan et al., "Effect of Composite Designs on Writability and Thermal Stability of Perpendicular Recording Media," 2010 IEEE, IEEE Transactions on Magnetics, vol. 47, No. 1, Jan. 2011, pp. 63-68.

(Continued)

*Primary Examiner* — Holly Rickman
*Assistant Examiner* — Linda Chau
(74) *Attorney, Agent, or Firm* — Zilka-Kotab, PC

(57) ABSTRACT

In one embodiment, a perpendicular magnetic recording medium includes an oxide recording layer including an oxide and a non-oxide recording layer which does not contain an oxide positioned above the oxide recording layer. The oxide recording layer includes a region R1 where a grain boundary width in a direction parallel to a plane of formation of R1 increases therealong from a lowermost portion of the oxide recording layer toward a medium surface, a region R3 positioned above R1 wherein a grain boundary width increases therealong toward the medium surface, a region R2 where a grain boundary width of R2 decreases therealong from R1 to R3, with R2 being positioned between R1 and R3, and a region R4 where a grain boundary width of R4 decreases therealong from R3 toward the medium surface, with R4 being positioned above R3 and near an uppermost portion of the oxide recording layer.

23 Claims, 10 Drawing Sheets

(56) References Cited

U.S. PATENT DOCUMENTS

| | | |
|---|---|---|
| 2010/0323220 A1 | 12/2010 | Onoue |
| 2011/0002064 A1 | 1/2011 | Nakagawa et al. |
| 2011/0038079 A1 | 2/2011 | Choe et al. |
| 2011/0097603 A1 | 4/2011 | Onoue |
| 2011/0111261 A1 | 5/2011 | Bian et al. |
| 2011/0122525 A1 | 5/2011 | Nemoto et al. |
| 2011/0141621 A1 | 6/2011 | Bian et al. |

FOREIGN PATENT DOCUMENTS

| | | |
|---|---|---|
| JP | 2003/168207 | 6/2003 |
| JP | 2007/184066 | 7/2007 |
| JP | 2008/135096 A | 6/2008 |
| JP | 2009/110606 | 5/2009 |
| JP | 2009/187597 | 8/2009 |
| JP | 2010/108582 A | 5/2010 |
| JP | 2011/014191 | 1/2011 |
| WO | 2010/038448 A1 | 4/2010 |

OTHER PUBLICATIONS

Tanahashi et al., "Dual Segregant Perpendicular Recording Media With Graded Properties," Magnetics, IEEE Transactions, vol. 45, Issue 2, Feb. 2009, pp. 799-804 (abstract only).

Nemoto et al., "Designing magnetics of capped perpendicular media with minor-loop analysis," Journal of Magnetism and Magnetic Materials, vol. 320, Issue 22, Nov. 2008, pp. 3144-3150 (abstract only).

\* cited by examiner

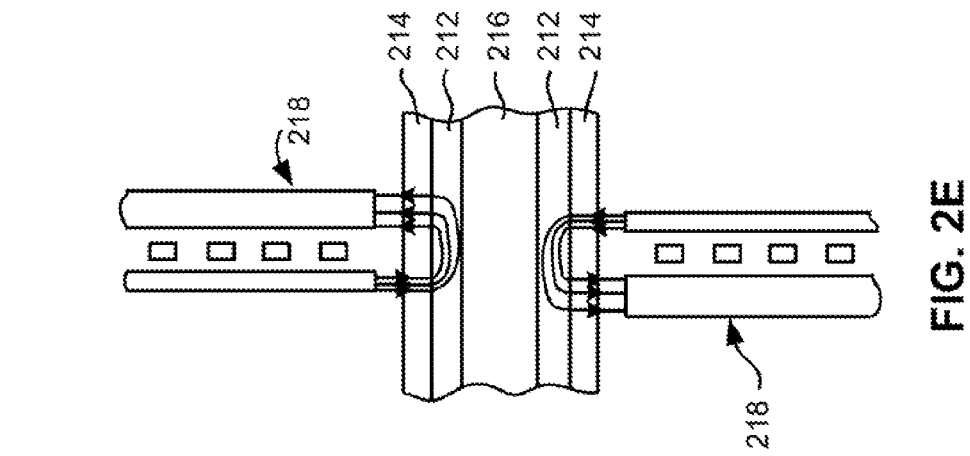
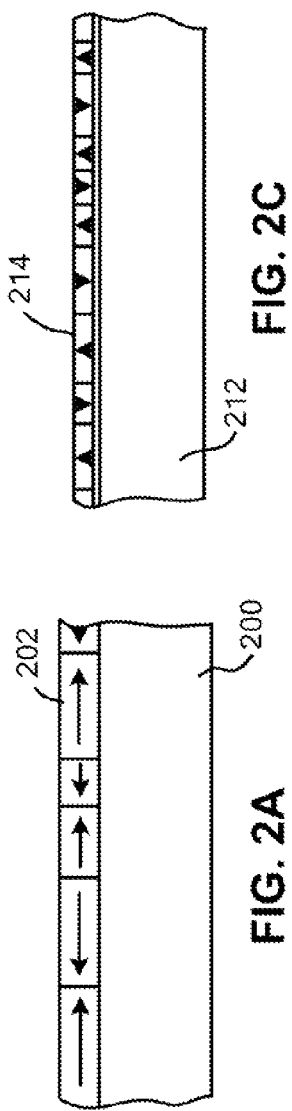
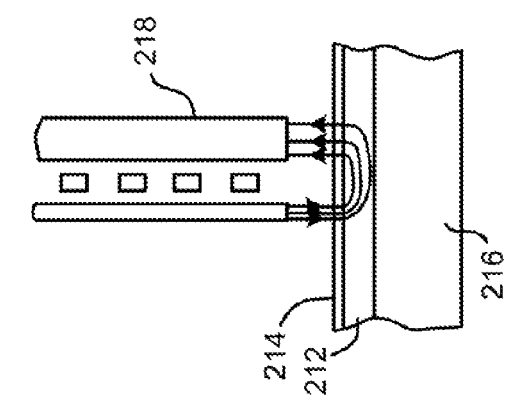
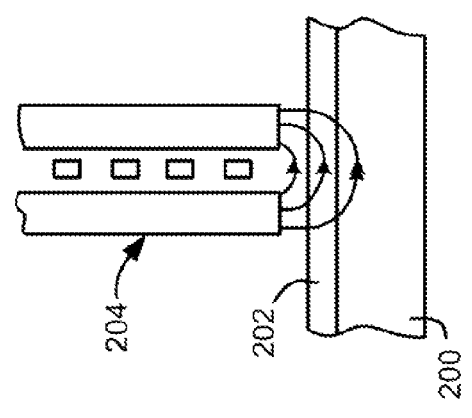

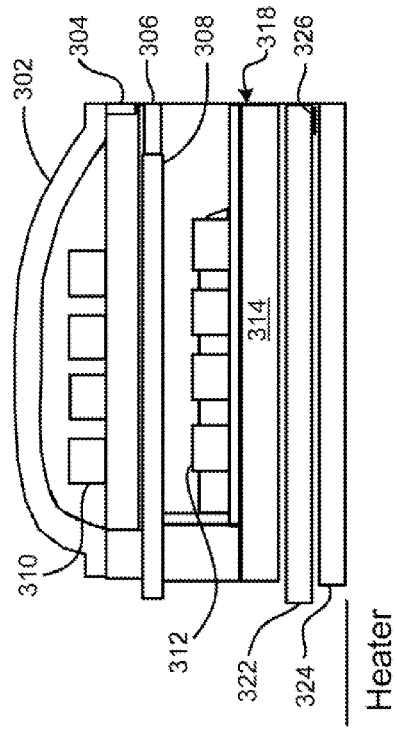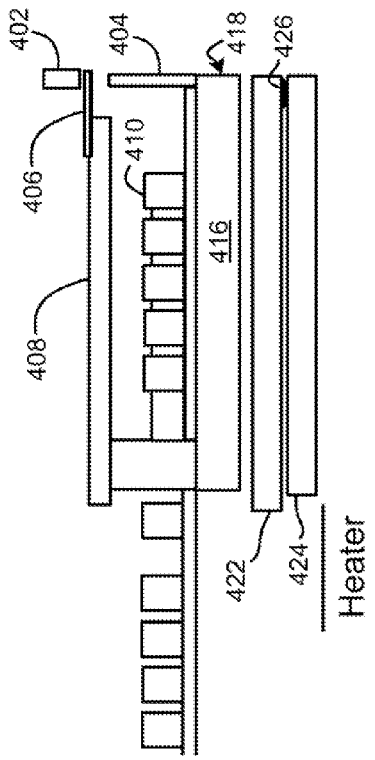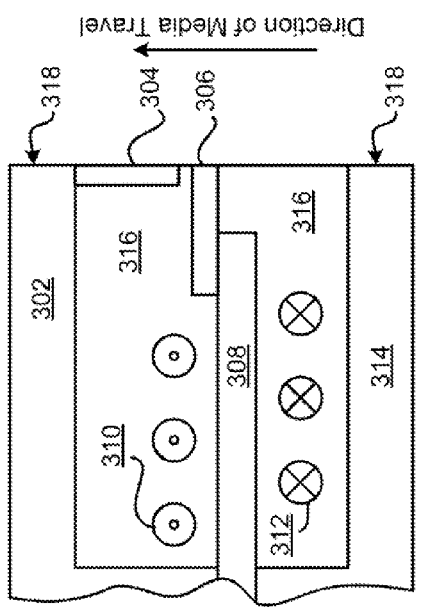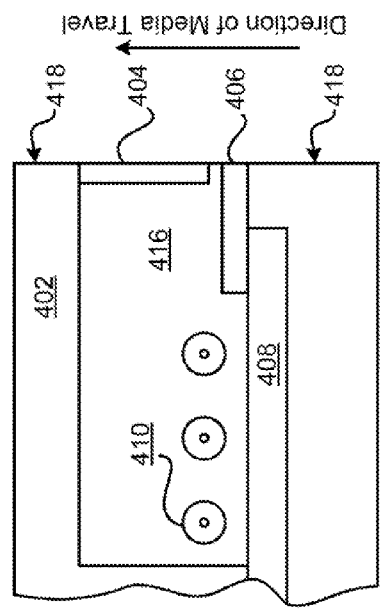
FIG. 3A
FIG. 3B
FIG. 4A
FIG. 4B

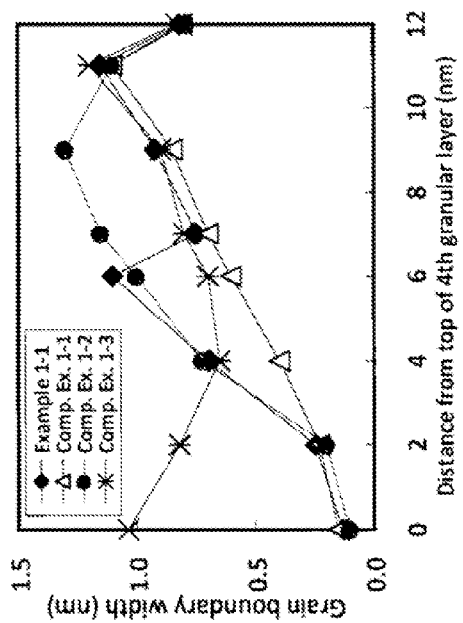
FIG. 7
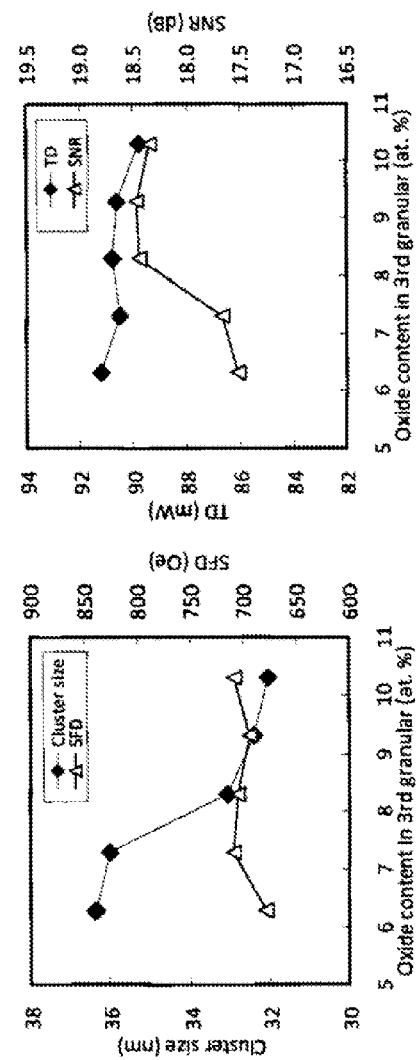
FIG. 8A
FIG. 8B

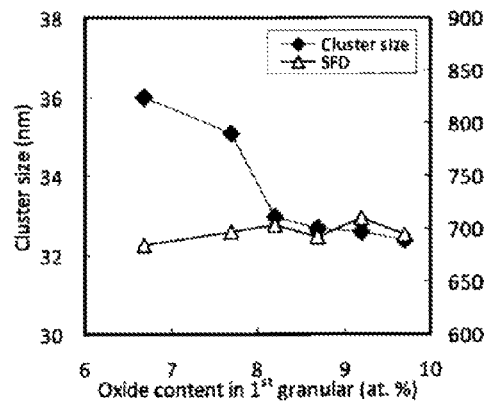 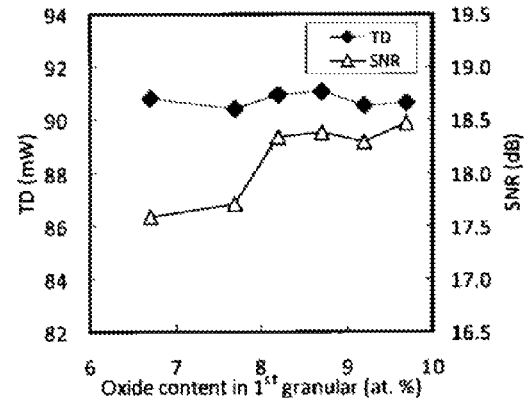
FIG. 9A    FIG. 9B
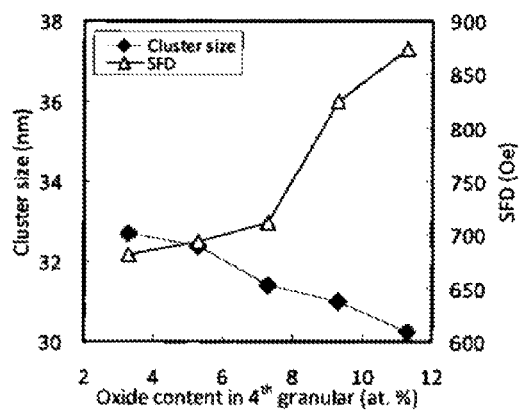 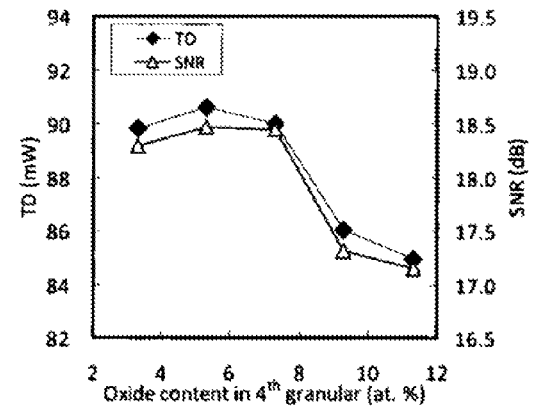
FIG. 10A    FIG. 10B
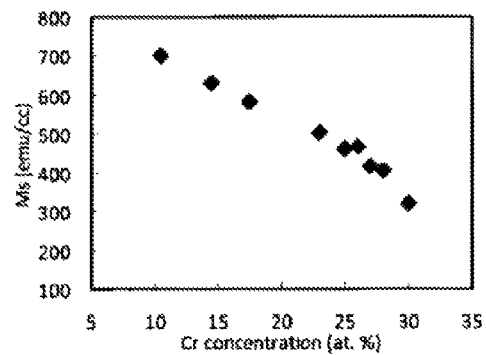
FIG. 11

PERPENDICULAR MAGNETIC RECORDING MEDIUM WITH GRAIN BOUNDARY CONTROLLING LAYERS

FIELD OF THE INVENTION

The present invention relates to magnetic recording media, and more particularly, to a perpendicular magnetic recording medium having grain boundary controlling layers.

BACKGROUND

In order to realize high-density recording, a reduction in medium noise is often pursued. In order to achieve a reduction in medium noise, it is effective to reduce the exchange interaction between grains of a recording layer. Currently, granular recording layers in many perpendicular recording media have a gradation of the magnetic anisotropy (Ku) in such a way that Ku becomes smaller toward the upper layer (a graded-Ku structure). For this graded-Ku structure, the top granular layer that exhibits a low Ku has a large exchange interaction between grains. Therefore, if the exchange interaction between grains in the top granular layer can be reduced, noise will be reduced.

It is important for a perpendicular magnetic recording medium to have improved writeability and signal to noise ratio (SNR) while the thermal stability of the magnetization is maintained. Many perpendicular magnetic recording media which are commercially available have a layered structure in which the following layers are stacked in succession on a substrate: a soft magnetic underlayer; a nonmagnetic intermediate layer; a recording layer; a protective layer having a carbon overcoat; and a lubricant (which may be applied after manufacturing of the medium and delivery to the user).

As disclosed in Japanese Patent Office (JPO) Pub. Nos. 2001-23144A, 2003-91808A and 2003-168207A, for example, a recording layer may have a structure in which a granular layer having a granular structure and a ferromagnetic metal layer which does not have a clear granular structure are stacked one above the other. The granular layer may be formed by a material having high magnetic anisotropy, and has the role of enhancing thermal stability. In the granular layer, oxides are segregated at the magnetic grain boundary. As a result, the grain boundary width increases and the magnetic cluster size is reduced. Noise decreases when the magnetic cluster size is reduced. A material consisting of a CoCrPt alloy and not containing any oxides is normally selected as the material for the ferromagnetic metal layer. A material having relatively low magnetic anisotropy forms the ferromagnetic metal layer, and therefore the switching field is reduced by using this layer. The ferromagnetic metal layer therefore improves writeability. Moreover, it is known that the combination of the granular layer and the ferromagnetic metal layer makes it possible to achieve a high level of writeability and high SNR while the thermal stability is maintained.

It is known that the Ku-graded structure in the recording layer is effective for improving media performance. The incoherent mode of magnetization reversal is promoted by a Ku-graded structure. The writeability can be improved when the incoherent mode is promoted.

JPO Pub. No. 2011-14191A, for example, discloses a configuration in which the granular layer has a two- or three-layer structure and the magnetic anisotropy decreases stepwise toward the upper layer. Such a configuration promotes the incoherent mode of magnetization reversal, and therefore the thickness of the ferromagnetic metal layer may be reduced while the writeability is adequately maintained, so the magnetic cluster size may be reduced.

Furthermore, JPO Pub. Nos. 2009-187597A and 2009-110606A disclose a lower granular layer formed on the substrate side that is formed by a magnetic material having relatively high magnetic anisotropy, and the following layers are formed thereon in succession: an exchange control layer (ECL); a granular layer formed of a material having relatively low magnetic anisotropy; and a ferromagnetic layer. The inter-layer exchange coupling is controlled by the ECL and then the incoherent mode of magnetization reversal is promoted. In addition to the Ku-graded structure, the ECL promotes the incoherent mode of magnetization reversal. As a result, the writeability is further improved. International Pub. No. WO2010/038448 also discloses the same kind of configuration in another example.

In International Pub. No. WO2010/038448, an ECL is formed between the main magnetic recording layer and the ferromagnetic layer with the aim of controlling the intermediate layer exchange coupling, and a nonmagnetic CoCr alloy is used for the ECL.

A region where there is a large distribution in the crystal orientation and magnetic grain size is present in the initial layer of the recording layer due to the lattice constant mismatch with the intermediate layer, among other things. This region is one cause of increased noise. International Pub. No. WO2010/038448 and JPO Pub. No. 2007-184066A disclose methods of correcting for this, for example. If the initial layer of the recording layer is formed by a material having low saturation magnetization, it is possible to suppress the noise caused by a large distribution in the crystal orientation and magnetic grain size. A material with a high Cr concentration and a high oxide concentration is selected as the material having low saturation magnetization. The role of this layer is to promote the grain growth in the recording layer formed above, and therefore it is often referred to as an "onset layer."

In order to achieve good read/write properties in a perpendicular magnetic recording medium, it is necessary to reduce the switching field distribution (SFD) and the magnetic cluster size, while also maintaining the writeability and surface roughness. Detailed investigations have been carried out from a number of perspectives with regard to a perpendicular magnetic recording medium in which the granular layer has at least a three-layer structure, and the following layers are stacked in succession from the substrate side: an onset layer; a high magnetic anisotropy layer (high-Ku layer); and a low magnetic anisotropy layer (low-Ku layer). The results showed that the inter-grain exchange interaction in the low-Ku layer was large, and this caused increased magnetic cluster size in the medium after stacking. Reducing the magnetic cluster size by reducing the inter-grain exchange interaction in the low-Ku layer is therefore effective for achieving good read/write properties.

The reason why the inter-grain exchange interaction in the low-Ku layer is increased is because the "onset layer" formed by a high oxide concentration plays a role for a onset of the grain growth of the recording layer. The onset layer makes it possible to increase the grain boundary width and reduce the inter-grain exchange interaction of the layer deposited on the onset layer.

However, it was found that as a result of careful observation of the cross-sectional structure using a transmission electron microscope, the region where the grain boundary width increased was only in the initial region of the recording layer nearest to the onset layer. It was also clear that, as the distance from the initial region increased, the grain boundary width decreased. The effect that the onset layer has in increasing the grain boundary becomes smaller and smaller the farther from the onset layer, such as toward the top of the recording layer.

Thus, a low-Ku layer positioned far from the onset layer results in a strong tendency for the grain boundary width to decrease. When the grain boundary width decreases, the inter-grain exchange interaction increases and the magnetic cluster size increases. In practice, investigations showed that when the above-mentioned low-Ku layer is formed on the upper layer of a high-Ku layer, the magnetic cluster size of the laminated medium is considerably increased. However, reducing the inter-grain exchange interaction of the low-Ku layer by changing the composition and deposition process of the low-Ku layer is very difficult from the point of view of writeability and surface roughness as described below.

For example, it is possible to reduce the inter-grain exchange interaction of the low-Ku layer by performing the following. First, raising the oxide concentration in the low-Ku layer in order to increase the grain boundary width; second, reducing the Cr concentration in the low-Ku layer and enhancing the magnetic anisotropy within the magnetic grains; and/or third, increasing the sputter gas pressure when the low-Ku layer is formed. However, in the first approach, the SFD increases. In the second approach, the writeability deteriorates. In the third approach, the surface roughness deteriorates. It is therefore difficult to achieve good recording characteristics with any of these conventional methods.

Therefore, it would beneficial to reduce magnetic cluster size and obtain good read/write properties without significantly changing the composition and deposition process of the low-Ku layer, e.g., while maintaining the writeability and surface roughness.

SUMMARY

In one embodiment, a perpendicular magnetic recording medium includes an oxide recording layer including an oxide and a non-oxide recording layer which does not contain an oxide positioned above the oxide recording layer. The oxide recording layer includes a region R1 where a grain boundary width in a direction parallel to a plane of formation of the region R1 increases therealong from a lowermost portion of the oxide recording layer toward a medium surface, at least one region R3 positioned above the region R1 wherein a grain boundary width increases therealong toward the medium surface, at least one region R2 where a grain boundary width of the region R2 decreases therealong from the region R1 to the region R3, the at least one region R2 being positioned between the region R1 and the region R3, and at least one region R4 where a grain boundary width of the region R4 decreases therealong from the region R3 toward the medium surface, the at least one region R4 being positioned above the region R3 and near an uppermost portion of the oxide recording layer.

In another embodiment, a perpendicular magnetic recording medium includes an oxide recording layer including an oxide and a non-oxide recording layer which does not contain an oxide positioned above the oxide recording layer. The oxide recording layer includes a first recording layer, a second recording layer, a third recording layer, and a fourth recording layer. Also, an oxide concentration of the first recording layer is greater than an oxide concentration of the second recording layer, an oxide concentration of the third recording layer is greater than an oxide concentration of the fourth recording layer, and the oxide concentration of the third recording layer is greater than the oxide concentration of the second recording layer.

In yet another embodiment, a method includes forming a first oxide recording layer including an oxide above a substrate, forming a second oxide recording layer on the first oxide recording layer, forming a third oxide recording layer on the second oxide recording layer, forming a fourth oxide recording layer on the third oxide recording layer, and forming a non-oxide recording layer which does not contain an oxide on the fourth oxide recording layer. An oxide concentration of the first oxide recording layer is greater than an oxide concentration of the second oxide recording layer, an oxide concentration of the third oxide recording layer is greater than an oxide concentration of the fourth oxide recording layer, and the oxide concentration of the third oxide recording layer is greater than the oxide concentration of the second oxide recording layer.

According to another embodiment, a perpendicular magnetic recording medium includes at least two oxide recording layers positioned below a non-oxide recording layer, wherein the at least two oxide recording layers each include an oxide, characterized in that the at least two oxide recording layers are adapted for controlling a grain boundary width in the recording layer.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 7 shows changes in the grain boundary width in the granular layer in the perpendicular direction of the medium, according to one embodiment.

FIGS. 8A-8B show a relationship between the oxide concentration, magnetic characteristics, and read/write properties in the third granular layer, according to one embodiment.

FIGS. 9A-9B show a relationship between the oxide concentration, magnetic characteristics, and read/write properties in the first granular layer, according to one embodiment.

FIGS. 10A-10B show a relationship between the oxide concentration, magnetic characteristics, and read/write properties in the fourth granular layer, according to one embodiment.

FIG. 11 shows a relationship between the Cr concentration and the saturation magnetization, according to one embodiment.

DETAILED DESCRIPTION

Figure 1:
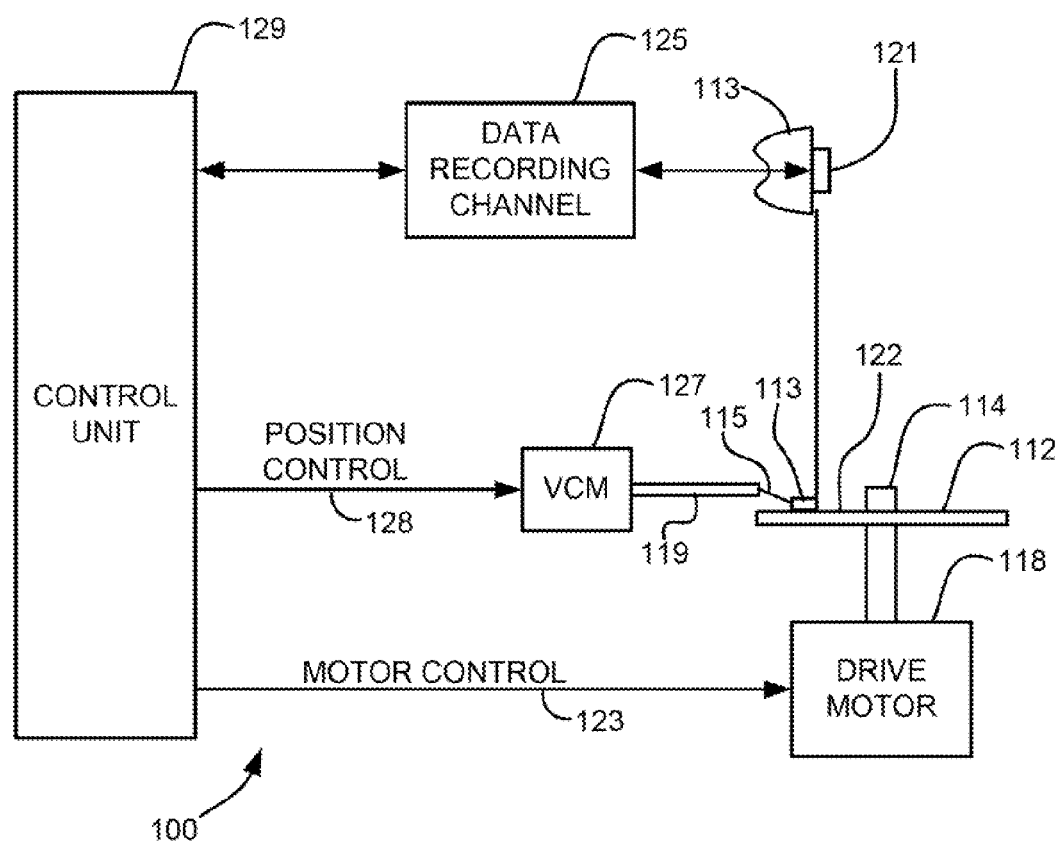
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a perpendicular magnetic recording medium includes an oxide recording layer including an oxide and a non-oxide recording layer which does not contain an oxide positioned above the oxide recording layer. The oxide recording layer includes a region R1 where a grain boundary width in a direction parallel to a plane of formation of the region R1 increases therealong from a lowermost portion of the oxide recording layer toward a medium surface, at least one region R3 positioned above the region R1 wherein a grain boundary width increases therealong toward the medium surface, at least one region R2 where a grain boundary width of the region R2 decreases therealong from the region R1 to the region R3, the at least one region R2 being positioned between the region R1 and the region R3, and at least one region R4 where a grain boundary width of the region R4 decreases therealong from the region R3 toward the medium surface, the at least one region R4 being positioned above the region R3 and near an uppermost portion of the oxide recording layer.

In another general embodiment, a perpendicular magnetic recording medium includes an oxide recording layer including an oxide and a non-oxide recording layer which does not contain an oxide positioned above the oxide recording layer. The oxide recording layer includes a first recording layer, a second recording layer, a third recording layer, and a fourth recording layer. Also, an oxide concentration of the first recording layer is greater than an oxide concentration of the second recording layer, an oxide concentration of the third recording layer is greater than an oxide concentration of the fourth recording layer, and the oxide concentration of the third recording layer is greater than the oxide concentration of the second recording layer.

In yet another general embodiment, a method includes forming a first oxide recording layer including an oxide above a substrate, forming a second oxide recording layer on the first oxide recording layer, forming a third oxide recording layer on the second oxide recording layer, forming a fourth oxide recording layer on the third oxide recording layer, and forming a non-oxide recording layer which does not contain an oxide on the fourth oxide recording layer. An oxide concentration of the first oxide recording layer is greater than an oxide concentration of the second oxide recording layer, an oxide concentration of the third oxide recording layer is greater than an oxide concentration of the fourth oxide recording layer, and the oxide concentration of the third oxide recording layer is greater than the oxide concentration of the second oxide recording layer.

According to another general embodiment, a perpendicular magnetic recording medium includes at least two oxide recording layers positioned below a non-oxide recording layer, wherein the at least two oxide recording layers each include an oxide, characterized in that the at least two oxide recording layers are adapted for controlling a grain boundary width in the non-oxide recording layer.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 using a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 that exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion that extends from the ABS to a flare point and a yoke portion that extends from the flare point to the back gap. The flare point is where the second pole piece begins to widen (flare) to form the yoke. The placement of the flare point directly affects the magnitude of the magnetic field produced to write information on the recording medium.

According to one illustrative embodiment, a magnetic data storage system may comprise at least one magnetic head as described herein according to any embodiment, a magnetic medium, a drive mechanism for passing the magnetic medium over the at least one magnetic head, and a controller electrically coupled to the at least one magnetic head for controlling operation of the at least one magnetic head.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "intermediate layer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment that uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 that may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
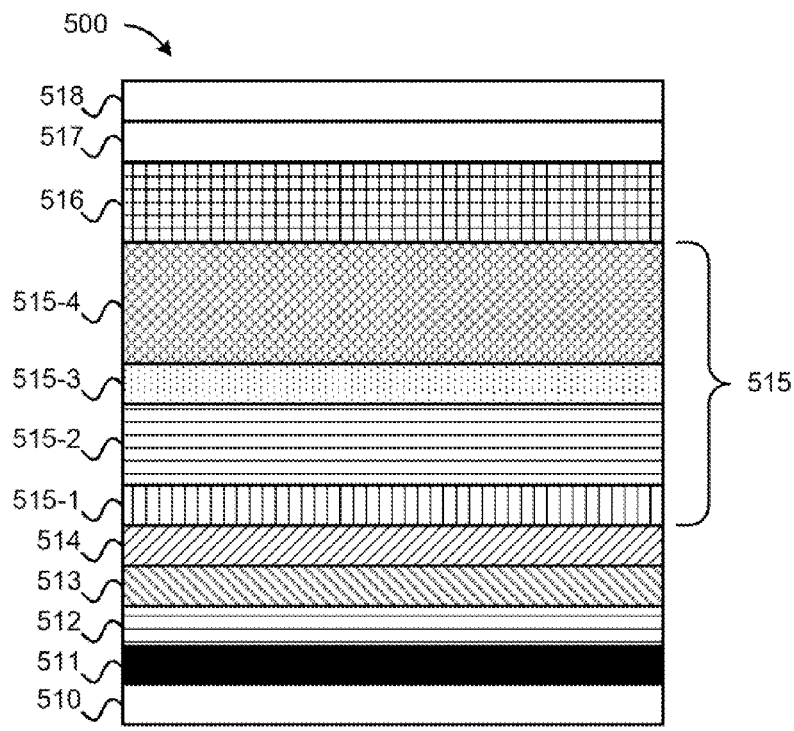
FIG. 5 is a schematic view in cross section showing a structure of a perpendicular magnetic recording medium, according to one exemplary embodiment.

According to one embodiment, a layer structure of a typical perpendicular magnetic recording medium 500 is shown in FIG. 5. The perpendicular magnetic recording medium shown comprises a substrate 510 upon which are successively formed an adhesion layer 511, a soft magnetic underlayer 512, a seed layer 513, and an intermediate layer 514, a granular layer 515 (which may comprise several layers), a ferromagnetic metal recording layer 516, a protective layer 517, and a liquid lubrication layer 518 (which may be formed after manufacturing of the magnetic medium, in one approach). Among these layers, a method for forming the granular layer 515 imparts distinctive structural features on the perpendicular magnetic recording medium, in one approach. Moreover, provided that the other layers are suitable for use with each other, including the basic structural characteristics thereof as would be known to one of skill in the art upon reading the present descriptions, there is no particular limitation as to the materials and formation methods thereof.

FIG. 5 schematically shows the cross-section of a perpendicular magnetic recording medium 500 constituting one exemplary embodiment. This perpendicular magnetic recording medium 500, according to this exemplary embodiment, was produced using a sputtering apparatus. All the chambers were exhausted to a level of vacuum of no more than $2\times10^{-5}$ Pa, after which a carrier with a substrate mounted thereon was moved to each process chamber in order to carry out successive processes. An adhesion layer 511, soft magnetic underlayer 512, seed layer 513, intermediate layer 514, granular layer 515, and ferromagnetic metal layer 516 were formed in succession on the substrate 510 using DC magnetron sputtering, and diamond-like carbon (DLC) was formed as a protective layer 517. Finally, a lubricant in which a perfluoroalkylpolyether-based material was diluted with a fluorocarbon material was applied as a liquid lubrication layer 518.

Figure 6:
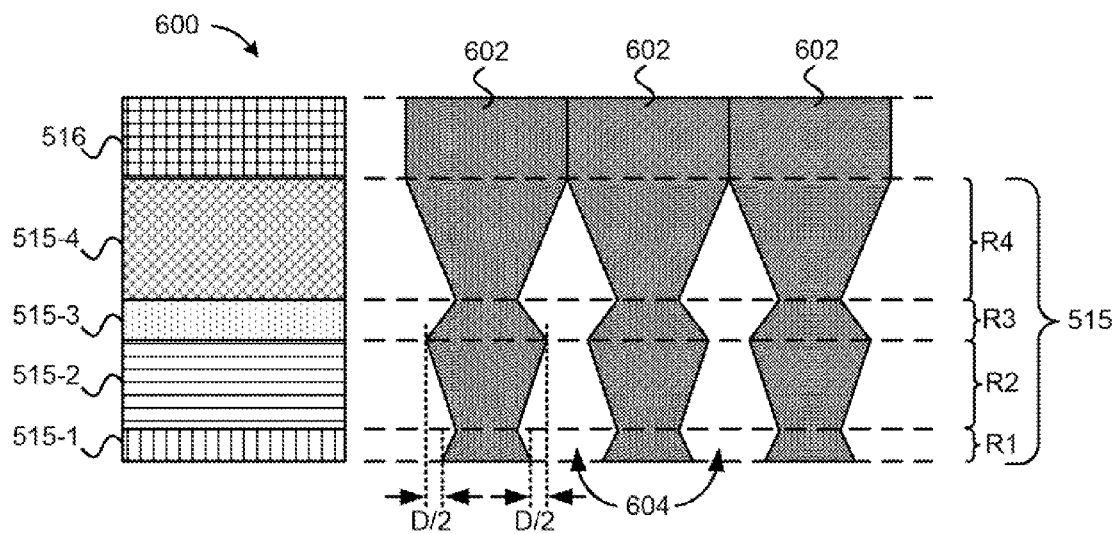
FIG. 6 shows a cross-sectional view of a structure of the grain shape in a perpendicular magnetic recording medium, according to one embodiment.

Another embodiment is characterized in that the cross-sectional structure of the shape of the grains and grain boundaries between adjacent grains in the granular layer is substantially as shown in FIG. 6. That is, the structure is characterized in that it includes a region R1 in which the width of the grain boundary 604 between adjacent grains increases from the lowermost part of the recording layer toward the surface of the medium. Beyond this area, there is a region R3 where the width of the grain boundary 604 increases toward the medium surface. Accordingly, a skilled artisan reading the present descriptions would also appreciate that the width of the grain 602 correspondingly decreases in response to an increase in the grain boundary 604 width.

Specifically, some preferred embodiments may be characterized in comprising a region R3 where the grain boundary width increases toward the medium surface, the region R3 lying between the abovementioned high-Ku layer (region R2) and low-Ku layer (region R4). Furthermore, the grain boundary width decreases in region R2, which is between regions R1 and R3. The grain boundary width decreases in the region between R3 and the uppermost part of the granular layer. Moreover, in some approaches as described herein, a plane of formation of either region R1 and/or region R3 may be referred to herein, which are considered to be planes which coincide with the dashed lines separating the regions R1-R4 from one another in FIG. 6. The regions R1-R4 may be formed by positioning different recording layers in succession, such as a first, a second, a third, and a fourth recording layer, in one approach. Of course, more or less recording layers may be used, as would be apparent to one of skill in the art upon reading the present descriptions.

In one such embodiment, a perpendicular magnetic recording medium comprises an oxide recording layer comprising an oxide, a non-oxide recording layer which does not contain an oxide positioned above the oxide recording layer wherein the oxide recording layer comprises a first recording layer, a second recording layer, a third recording layer, and a fourth recording layer. An oxide concentration of the first recording layer is greater than an oxide concentration of the second recording layer, an oxide concentration of the third recording layer is greater than an oxide concentration of the fourth recording layer, and the oxide concentration of the third recording layer is greater than the oxide concentration of the second recording layer.

In one approach, a thickness of the first recording layer may be between about 0.5 nm and about 3.0 nm, and a thickness of the third recording layer may be between about 1.0 nm and about 4.0 nm. Of course, other thicknesses are possible as would be understood by one of skill in the art upon reading the present descriptions.

In another approach, a magnetic anisotropy (Ku) of the fourth recording layer may be smaller than Ku of the second recording layer. In this approach, a saturation magnetization of the third recording layer may also be lower than a saturation magnetization of the fourth recording layer.

In one approach, a ratio of concentrations of Pt and Cr in the fourth recording layer (Pt concentration/Cr concentration) may be smaller than a ratio of concentrations of Pt and Cr in the second recording layer. In this approach, a saturation magnetization of the third recording layer may also be lower than a saturation magnetization of the fourth recording layer. In yet another approach, a Cr concentration in the third recording layer may be greater than a Cr concentration in the fourth recording layer and the second recording layer.

In another approach, the fourth recording layer may have a structural characteristic of being formed with a lower sputter gas pressure than a sputter gas pressure used when the first, second, and third recording layers are formed. For example, the fourth recording layer may have a smoother medium surface than the first, second, and third recording layers. This structural characteristic of less surface roughness may be caused by the lower sputter gas pressure.

Moreover, some embodiments may be characterized in that a grain 602 size at the interface between regions R3 and R2 may be greater than a grain 602 size at the lowermost boundary of region R1 by a distance D, where the grain 602 is wider on each side of the grain 602 by a distance D/2. In other words, in region R1 the grain boundary width increases in a direction perpendicular to a plane of formation of the region R1 from a lowermost portion of the oxide recording layer toward a medium surface. Similarly, in region R3, the grain boundary width increases in a direction perpendicular to a plane of formation of the region R3 toward the medium surface. Moreover, in region R2, positioned between regions R1 and R3, and region R4, positioned above region R3 and near an uppermost portion of the oxide recording layer, the grain boundary width may decrease, in one approach.

A granular layer such as this is characterized in one embodiment by having a four-layer structure made of materials suitable for causing desired effects throughout the recording layer, such as the materials described herein and others that would be understood by one of skill in the art upon reading the present descriptions. The granular layer 515 may be formed from an oxide-containing magnetic alloy which comprises Co, Cr, and Pt, among other materials, in one approach. Specifically, it is possible to use a magnetic alloy containing Co—Cr—Pt alloy, Co—Cr—Pt—B alloy, Co—Cr—Pt—Mo alloy, Co—Cr—Pt—Nb alloy, Co—Cr—Pt—Ta alloy, Co—Cr—Pt—Ni alloy, Co—Cr—Pt—Ru alloy, and one or more oxides from oxides of Si, Ti, Ta, Nb, B, W, Cr. A first granular layer 515-1, second granular layer 515-2, third granular layer 515-3, and fourth granular layer 515-4 may be formed in succession from the substrate 510 side. The perpendicular magnetic recording medium 500 according to this embodiment is characterized by the following relationship among the oxide concentration contained in the first granular layer ($O_{c1}$), the second granular layer ($O_{c2}$), the third granular layer ($O_{c3}$), and the fourth granular layer ($O_{c4}$).

$$O_{c1} > O_{c2}$$

$$O_{c3} > O_{c2}$$

$$O_{c3} > O_{c4} \quad \text{(Relationship 1)}$$

In the granular layer, the oxides are segregated at the grain boundary in such a way as to surround the magnetic grains, in one embodiment. This means that the higher the oxide concentration, the wider the grain boundary-tends to be. Relationship 1 shows that the mean grain boundary width of the first granular layer is greater than the mean grain boundary width of the second granular layer, and the mean grain boundary width of the third granular layer is greater than the mean grain boundary widths of the second granular layer and the fourth granular layer. The respective layers and grain boundary widths have the corresponding relationships as shown in FIG. 6 and described above.

Referring again to FIGS. 5-6, the first granular layer 515-1 is an onset layer that has the role of promoting grain boundary formation in the initial part of the recording layer. A material having a high oxide concentration is therefore used for the first granular layer 515-1, in some approaches. The intermediate layer 514, which is positioned as the layer below the first granular layer 515-1, does not contain oxide, and therefore a region where the grain boundary width increases toward the medium surface is present within the first granular layer 515-1 because the first granular layer 515-1 which has a high oxide concentration is stacked on the intermediate layer 514.

The second granular layer 515-2 is one of the main recording layers. The second granular layer 515-1 has the role of improving thermal stability, and therefore it is formed from a material having high magnetic anisotropy, in one approach. Furthermore, the oxide concentration of the second granular layer 515-2 has to be lower than the oxide concentration of the first granular layer 515-1. The reason for this is that when the second granular layer 515-2 contains a large amount of oxide, there are more cases in which the oxide penetrates the magnetic grains, and therefore there are more subgrains. As a result, the thermal stability deteriorates and the SFD increases. When the oxide concentration of the second granular layer 515-2 becomes lower than the oxide concentration of the first granular layer 515-1, a region where the grain boundary width decreases toward the medium surface is present within the second granular layer 515-2.

The third granular layer 515-3 acts to once again increase the grain boundary width that decreases when the second granular layer 515-2 is formed, and has the role of promoting grain boundary formation in the fourth granular layer 515-4 that is formed as the layer above the third granular layer 515-3, according to one approach. The oxide concentration in the third granular layer 515-3 therefore is higher than the oxide concentration in the second granular layer 515-2 and the oxide concentration in the fourth granular layer 515-4, in one approach. The oxide concentration in the third granular layer 515-3 is higher than the oxide concentration in the second granular layer 515-2, and therefore a region where the grain boundary width increases toward the medium surface is formed within the third granular layer 515-3. If the thickness of the third granular layer 515-3 having a high oxide concentration is too great, there are more subgrains and the SFD deteriorates. Accordingly, the thickness of the third granular layer 515-3 is preferably not too great to suppress these negative effects.

At the same time, the third granular layer 515-3 has the role of appropriately controlling the inter-layer exchange interaction of the second granular layer 515-2 and the fourth granular layer 515-4, and also has the role of promoting incoherent rotation of magnetization and improving writeability, in one approach. The saturation magnetization of the third granular layer 515-3 therefore is lower than the saturation magnetization of the fourth granular layer 515-4, in one approach.

The second granular layer 515-2 and the fourth granular layer 515-4 comprise the main recording layer. The fourth granular layer 515-4 has the role of improving writeability, in one approach. The magnetic anisotropy of the fourth granular layer 515-4 therefore has to be smaller than the magnetic anisotropy of the second granular layer 515-2. At the same time, the fourth granular layer 515-4 also has the role of reducing the SFD and reducing the medium surface roughness. The oxide concentration in the fourth granular layer 515-4 therefore is lower than the oxide concentration in the third granular layer 515-3, in one approach. The oxide concentration in the fourth granular layer 515-4 is lower than the oxide concentration in the third granular layer 515-3, and therefore the grain boundary width decreases toward the medium surface within the fourth granular layer 515-4. Furthermore, the medium surface roughness is further reduced when the fourth granular layer 515-4 is formed at a lower sputter gas pressure than the sputter gas pressure when the first granular layer 515-1, second granular layer 515-2, and third granular layer 515-3 are formed.

In some embodiments, some or all of the layers 515-1 to 515-4 may be repeated in a structure as many times as desired in order to provide a magnetic recording layer with different and/or desired properties.

A description has been given here of a case in which an oxide-containing CoCrPt alloy is used in the first granular layer 515-1, but this layer is not limited to a magnetic alloy, provided that it is formed with the purpose of promoting grain boundary formation in the initial layer of the recording layer. Specifically, it is possible to use a nonmagnetic alloy material containing at least one or more from oxides of Si, Ti, Ta, B, and Cr with Ru, for example. Alternatively, it is possible to adopt a two-layer structure in which an oxide-containing CoCrPt alloy is stacked on the abovementioned nonmagnetic alloy material. If the first granular layer has such a two-layer structure, the mean value of the oxide concentration therein is higher than that of the fourth granular layer 515-4 and the second granular layer 515-2, in one approach.

As described herein, in order to achieve compatibility of thermal stability and writeability, the magnetic anisotropy ($Ku_4$) of the fourth granular layer 515-4 is made to be lower than the magnetic anisotropy ($Ku_2$) of the second granular layer 515-2 that is capable of functioning as another main recording layer, in one embodiment, e.g., $Ku_4 < Ku_2$.

The magnetic anisotropy of CoCrPt alloy may be adjusted by adjusting the ratio of the concentration of Cr and Pt in the alloy.

Specifically, when X is the Pt concentration divided by the Cr concentration, e.g., X=(Pt concentration)/(Cr concentration), the greater the value of X, the greater the magnetic anisotropy. Conversely, the smaller the value of X, the smaller the magnetic anisotropy. Accordingly, the value of X in the fourth granular layer ($X_4$) therefore is made to be smaller than the value of X in the second granular layer ($X_2$), e.g., $X_4 < X_2$.

As described above, in order to maintain good writeability, it is useful to suppress the inter-layer exchange interaction of the second granular layer and the fourth granular layer to a suitable region or level. In order to do so, the saturation magnetization ($Ms_3$) of the third granular layer is made to be smaller than the saturation magnetization ($Ms_4$) of the fourth granular layer, e.g., $Ms_3 < Ms_4$.

If the saturation magnetization of the third granular layer is too great, the inter-layer exchange interaction between the second granular layer and the fourth granular layer is too intense and the incoherency of magnetization reversal is weakened, and the writeability deteriorates.

The saturation magnetization in CoCrPt alloy is generally inversely proportional to the Cr concentration. Accordingly, the Cr concentration ($Y_3$) in the third granular layer is made to be higher than the Cr concentration ($Y_4$) in the fourth granular layer, e.g., $Y_3 > Y_4$.

The thickness of the first granular layer also depends on the oxide concentration of the material used, but may be between about 0.5 nm and about 3.0 nm in various embodiments. If the thickness is less than about 0.5 nm, an adequate oxide segregation effect is not achieved, while if it is greater than about 3.0 nm, the recording layer becomes thicker so the writeability deteriorates. The thickness of the third granular layer also depends on the oxide concentration and saturation magnetization of the material used, but may be between about 1.0 nm and about 4.0 nm, in some approaches. If the thickness is less than about 1.0 nm, the inter-layer exchange interaction of the second granular layer and the fourth granular layer is too intense so the incoherency of magnetization reversal is weakened, and the writeability deteriorates. If the thickness is greater than about 4.0 nm, the SFD increases and noise increases.

The presence of the third granular layer that is formed in the middle of the granular layer in order to control the grain boundary width is one feature. By forming a layer that controls the grain boundary width directly below a low-Ku layer, it is possible to increase the mean grain boundary width of the low-Ku layer, so the inter-grain exchange interaction thereof can be reduced, and the magnetic cluster size decreases as a result. Furthermore, since there is no need to change the material of the low-Ku layer or the deposition process thereof, the SFD, magnetic cluster size and writeability can be reduced while surface roughness are maintained, so it is possible to achieve good read/write properties.

With the granular layer structure described above, the only layers that control the grain boundary width are the first granular layer and the third granular layer. However, when the granular layer is formed by a greater number of layers, it can be readily inferred that it is possible to include three or more layers that control the grain boundary width. When a grain boundary control layer is formed directly below a layer that tends to have a small grain boundary width, the magnetic cluster size can be reduced while the SFD, the writeability, and the surface roughness are maintained.

Referring again to FIG. 5, one embodiment of the perpendicular magnetic recording medium is described below with respect to constituents other than the granular layer 515. Various types of substrate may be used for the substrate 510, such as a glass substrate, aluminum alloy substrate, plastic substrate or silicon substrate. There is no particular limitation as to the material of the adhesion layer 511 provided that it has good adhesion with the substrate 510 and excellent planarity, but it preferably contains at least two or more types of material selected from Ni, Co, Al, Ti, Cr, Zr, Ta and Nb. Specifically, use may be made of TiAl, NiTa, TiCr, AlCr, NiTaZr, CoNbZr, TiAlCr, NiAlTi, CoAlTi, or the like. The thickness is preferably in the range of about 2 nm to 40 nm. If it is less than about 2 nm, the effect as an adhesion layer is poor, and even if it is formed to be greater than about 40 nm, there is no improvement in performance as an adhesion layer and producibility is reduced, so this is undesirable.

The soft magnetic underlayer 512 has the role of suppressing broadening of the magnetic field produced by the magnetic head and of effectively magnetizing the recording layers 515 and 516. There is no particular limitation as to the material of the soft magnetic underlayer, provided that the saturation magnetic flux density (Bs) is at least about 0.5 Tesla, uniaxial anisotropy is imparted in the radial direction of the disk substrate, the coercive force measured in the head travel direction is no greater than about 2.4 kA/m, and the surface planarity is sufficient. Specifically, the abovementioned characteristics can be readily achieved by using an amorphous alloy comprising Co or Fe as the main component with Ta, Nb, Zr, B or Cr, etc., added thereto.

The thickness value for the soft magnetic underlayer 512 varies according to the distance to the granular layer 515, the material, and the magnetic head with which the underlayer is combined, but in general the thickness is preferably in a range from about 10 nm to about 100 nm. Furthermore, it is also possible to use an alloy having an fcc structure in part of the soft magnetic underlayer 512. This is formed with the aim of controlling the crystal orientation of the seed layer 513 that is formed on the soft magnetic underlayer 512, and specifically it is possible to use a material in which Ta, Nb, W, B, V or the like is added to CoFe. The thickness may be in a range from about 1 nm to 10 nm.

The seed layer 513 has the role of controlling the crystal orientation and grain size in the intermediate layer 514. A metal having an fcc structure or an amorphous material may be used for the seed layer 513. Specific materials that form an fcc structure include Ni, Cu, Pd and Pt, and good crystal orientation is achieved by adding one or more elements selected from Cr, W, V, Mo, Ta and Nb. Furthermore, by using a magnetic material that also has an fcc structure, it is possible to endow the seed layer with the same role as the soft magnetic layer, and it is possible to reduce the distance between the magnetic head and the soft magnetic layer.

Specifically, less than about 10 at % of Ta, W, Nb, Cr, B or the like is preferably added to NiFe or CoFe having a composition that forms an fcc structure. The thickness for the seed layer varies according to the material and thickness of the intermediate layer and the recording layer and to the recording/reproduction head with which it is combined, but the thickness is preferably in a range from about 2 nm to 10 nm. If seed layer thickness is less than about 2 nm, the crystal orientation may be poor, so this is undesirable. On the other hand, if seed layer thickness is greater than about 10 nm, the crystal grain size in the recording layer increases, which is also undesirable. In addition, if the crystal grain size in the recording layer needs to be reduced further, it is possible to use an amorphous material. Specifically, the materials include Ta, TiAl, CrTi, NiTa, or the like, and good crystal orientation is achieved when the thickness is in a range from about 1 nm to 4 nm.

The intermediate layer 514 enhances the crystal orientation of the recording layers 515 and 516 and is also formed with the aim of promoting magnetic separation. Specifically, it is possible to make use of Ru or Ru alloy having an hcp structure in which an element such as Cr, Ta, W, Mo, Nb, Co, etc., as would be understood by one having ordinary skill in the art upon reading the present descriptions, is added to Ru. It is possible to achieve compatibility of crystal orientation and grain boundary formation by varying the sputtering conditions and material. Specifically, it is possible to adopt a sputtering process in which the layer is formed under a low gas pressure at the start of formation in order to enhance the crystal orientation, and the gas pressure is increased immediately before the end of formation for the sake of magnetic separation, or it is possible to form a two- or three-stage structure under varying conditions of gas pressure and material. A low gas pressure is specifically about 1 Pa or less. A high gas pressure is in the range from about 2 Pa to 6 Pa, and by setting the pressure in this range, the surface roughness of Ru increases and the grain boundary is formed. The film thickness is preferably in the range from about 4 nm to 20 nm. If it is less than 4 nm, the crystal orientation is poor, while if it is greater than 20 nm, the distance between the magnetic head and the soft magnetic layer increases, so writeability deteriorates.

The ferromagnetic metal layer 516 preferably comprises CoCrPt as the main component, with the addition of at least one element selected from B, Ta, Ru, Ti, W, Mo, Nb, Ni and Mn. The individual compositions and thicknesses may be adjusted to suit the thickness of the soft magnetic underlayer and the performance of the magnetic head, and there are no particular restrictions provided that the range makes it possible to maintain the thermal stability.

A film that has a thickness from about 2 nm to 5 nm and mainly comprises carbon preferably forms the protective layer 517. A lubrication layer such as perfluoroalkylpolyether is preferably used for the liquid lubrication layer 518. As a result, it is possible to obtain a very reliable magnetic recording medium.

Figure 17:
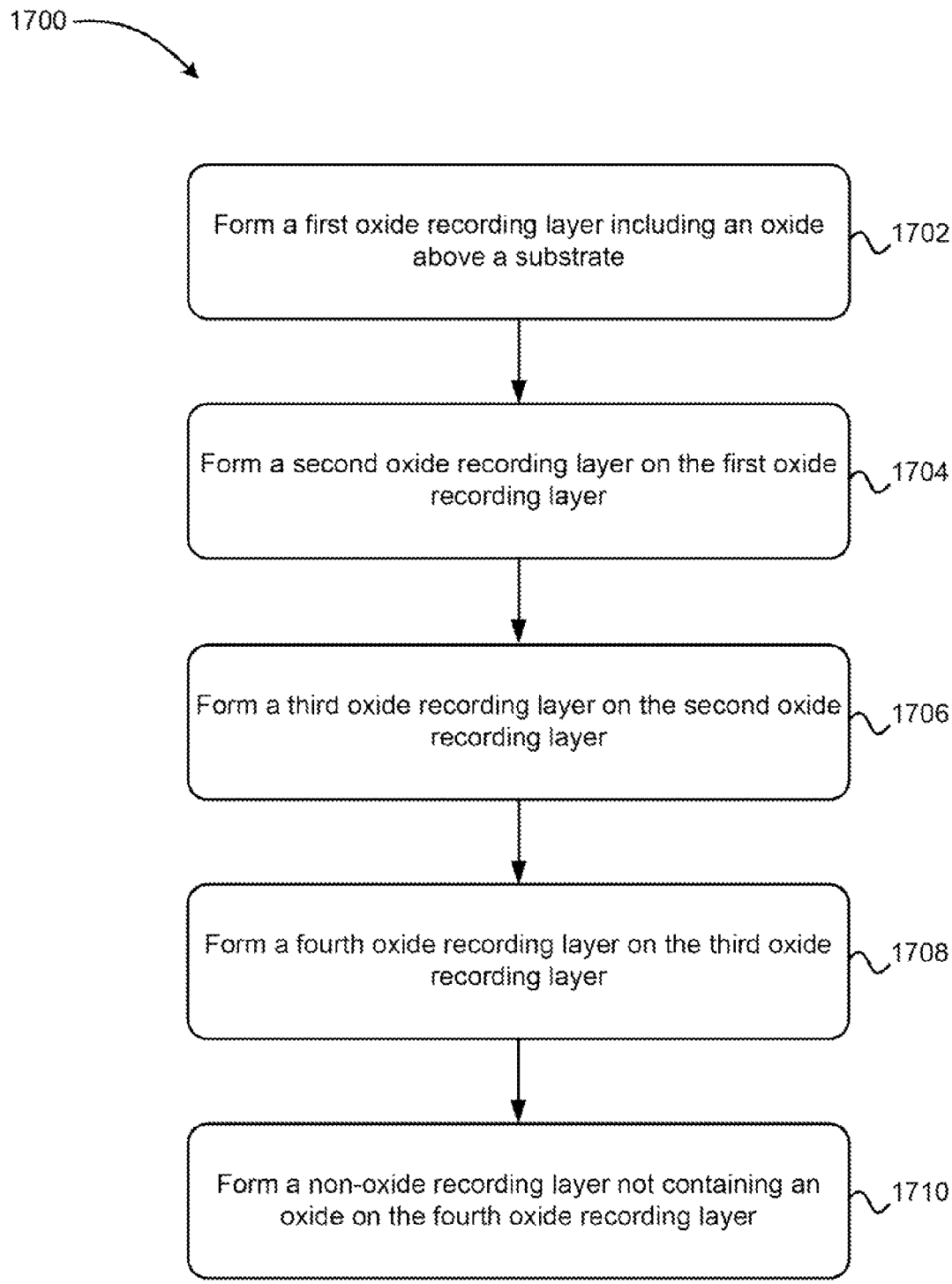
FIG. 17 shows a flowchart of a method, according to one embodiment.

Now referring to FIG. 17, a method 1700 is shown according to one embodiment. The method 1700 may be carried out in any desired environment, and may make use of any devices or structures with which to carry out the method 1700, according to various embodiments. Of course, more or less operations than those described in FIG. 17 may be included in method 1700 according to various embodiments.

In operation 1702, a first oxide recording layer is formed on or above a substrate, the first oxide recording layer comprising an oxide. Any substrate, oxide recording layer, and formation method may be used, as described herein or known to one of skill in the art.

In operation 1704, a second oxide recording layer is formed on or above the first oxide recording layer, the second oxide recording layer comprising an oxide. Any oxide recording layer and formation method may be used, as described herein or known to one of skill in the art.

In operation 1706, a third oxide recording layer is formed on or above the second oxide recording layer, the third oxide recording layer comprising an oxide. Any oxide recording layer and formation method may be used, as described herein or known to one of skill in the art.

In operation 1708, a fourth oxide recording layer is formed on or above the third oxide recording layer, the fourth oxide recording layer comprising an oxide. Any oxide recording layer and formation method may be used, as described herein or known to one of skill in the art.

In operation 1710, a non-oxide recording layer is formed on or above the fourth oxide recording layer, the non-oxide recording layer not containing any oxide. The non-oxide layer is intended to be a layer which does not substantially include any oxide. Of course, as is known in the art, it is difficult or virtually impossible to completely remove oxides from any layer. However, the non-oxide layer is formed from materials and in such a manner as to remove as much oxide therefrom as is possible. Any non-oxide recording layer and formation method may be used, as described herein or known to one of skill in the art.

In one embodiment, a grain boundary width of the first oxide recording layer may increase in a direction perpendicular to a plane of formation of the first oxide recording layer from a lowermost portion of the first oxide recording layer toward a medium surface.

In another embodiment, a widest grain width in the third oxide recording layer may, be wider than a widest grain width in the first oxide recording layer.

In another embodiment, a grain boundary width of the third oxide recording layer may increase in a direction perpendicular to a plane of formation of the third oxide recording layer toward the medium surface.

According to one approach, a grain boundary width of the second oxide recording layer may decrease, and a grain boundary width of the fourth oxide recording layer may decrease.

The method 1700, according to various embodiment, may further include any or all of forming an adhesion layer above the substrate, forming a soft magnetic underlayer above the adhesion layer, forming a seed layer above the soft magnetic underlayer, and forming an intermediate layer above the seed layer, wherein the first oxide recording layer is formed above the intermediate layer.

EXPERIMENTS AND EXEMPLARY EMBODIMENTS

Exemplary Embodiment 1

Referring again to FIGS. 5-6, a glass substrate of thickness 0.8 nm and diameter 65 nm was used as the substrate 510. A Ni-37.5Ta was formed to 15 nm as the adhesion layer 511 under conditions of Ar gas pressure of approximately 0.5 Pa, and the soft magnetic underlayer 512 was formed as two layers, namely a Co-28Fe-3Ta-5Zr alloy film of thickness 30 nm, with the interposition of an Ru film of thickness 0.4 nm under conditions of Ar gas pressure of approximately 0.4 Pa. A Ni-10Cr-6W film of thickness 7 nm was formed thereon as the seed layer 513. Ru of thickness 4 nm was formed under conditions of Ar gas pressure of approximately 0.5 Pa as the intermediate layer 514, and also Ru of thickness 5 nm was formed under conditions of Ar gas pressure of approximately 3.3 Pa, and Ru of thickness 5 nm was formed thereon under conditions of Ar gas pressure of approximately 6.0 Pa, in one embodiment.

In some approaches, the first granular layer, second granular layer, third granular layer and fourth granular layer were all formed in different sputtering chambers. The first granular layer was formed with a two-layer structure. The lower layer of the first granular layer was formed to a thickness of 0.5 nm under conditions of Ar gas pressure of approximately 4 Pa using a Ru-20Ti-10TiO$_2$ target. The upper layer of the first granular layer was formed to a thickness of 0.5 nm under conditions of Ar gas pressure of approximately 4 Pa and substrate bias −200 V, using a [Co-30Cr-18.5Pt]-3SiO$_2$-3TiO$_2$-2.5Co$_3$O$_4$ target. The second granular layer was formed to a thickness of 4 nm under conditions of Ar gas pressure of approximately 4 Pa and substrate bias −200 V, using a [Co-22.5Pt-10.5Cr]-2SiO$_2$-2TiO$_2$-2B$_2$O$_3$-1.5Co$_3$O$_4$ target. The third granular layer was formed to a thickness of 2 nm under conditions of Ar gas pressure of about 4 Pa, using a [Co-30Cr-18.5Pt]-6SiO$_2$-2.5Co$_3$O$_4$, target. The fourth granular layer was formed to a thickness of 5 nm under conditions of Ar gas pressure of about 0.9 Pa using a [Co-26Cr-10.5Pt]-4SiO$_2$-1Co$_3$O$_4$ target.

When the Ar gas pressure in the fourth granular layer was made lower than that in the other granular layers, it was possible to improve the surface roughness of the medium. The ferromagnetic metal layer 516 was formed to a thickness of 3 nm using a Co-15Cr-14Pt-8B target. A DLC (diamond-like carbon) film of thickness 3 nm was formed as the protective layer 517. Finally, a lubricant perfluoroalkylpolyether-based material in which was diluted with a fluorocarbon material was applied as the liquid lubrication layer 518.

As comparative examples in addition to the above, samples were prepared in which the materials of the second, third and fourth granular layers were altered. The target materials used to form each layer are collated in Table 1, shown below.

ness. The grain boundary width distribution of Example 1-1 corresponds to the structure shown in FIG. 6, which was described previously, above.

TABLE 2

|  | Cluster Size (nm) | SFD (Oe) | TD (mW) | SNR (dB) |
|---|---|---|---|---|
| Ex. 1-1 | 32.3 | 692 | 90.7 | 18.6 |
| Comp. Ex. 1-1 | 36.4 | 710 | 90.5 | 17.6 |
| Comp. Ex. 1-2 | 32.1 | 800 | 90.0 | 17.5 |
| Comp. Ex. 1-3 | 30.9 | 872 | 85.2 | 17.3 |

Table 2, immediately above, shows the magnetic cluster size, SFD, signal-to-noise ratio (SNR), and medium surface planarity for the samples produced. The magnetic cluster size and SFD were obtained by a process involving analysis of the minor loop using a Kerr effect magnetometer, as would be understood by one of skill in the art. The saturation magnetization value Ms was measured using a vibrating sample magnetometer (VSM) which was used for calibrating the absolute value of magnetization. The read/write properties of the medium were evaluated by spin stand testing.

The evaluation was carried out using a magnetic head comprising a single pole-type recording element of track width 70 nm, and a reproduction element employing tunnel magnetoresistance of track width 60 nm, under conditions of circumferential speed 10 m/s, skew angle of 0°, and magnetic spacing of approximately 8 nm. The surface planarity of the medium was evaluated using touchdown power (TD) in ther-

TABLE 1

|  | 2nd granular layer | 3rd granular layer | 4th granular layer |
|---|---|---|---|
| Ex. 1-1 | [Co—10.5Cr—22.5Pt]—2SiO$_2$—2TiO$_2$—2B$_2$O$_3$—1.5Co$_3$O$_4$ | [Co—30Cr—18.5Pt]—6SiO$_2$—2.5Co$_3$O$_4$ | [Co—26Cr—10.5Pt]—4SiO$_2$—1Co$_3$O$_4$ |
| Comp. Ex. 1-1 | [Co—10.5Cr—22.5Pt]—2SiO$_2$—2TiO$_2$—2B$_2$O$_3$—1.5Co$_3$O$_4$ | [Co—30Cr—18.5Pt]—4SiO$_2$—2.5Co$_3$O$_4$ | [Co—26Cr—10.5Pt]—4SiO$_2$—1Co$_3$O$_4$ |
| Comp. Ex. 1-2 | [Co—10.5Cr—22.5Pt]—5SiO$_2$—5TiO$_2$—1.5Co$_3$O$_4$ | [Co—30Cr—18.5Pt]—6SiO$_2$—2.5Co$_3$O$_4$ | [Co—26Cr—10.5Pt]—4SiO$_2$—1Co$_3$O$_4$ |
| Comp. Ex. 1-3 | [Co—10.5Cr—22.5Pt]—2SiO$_2$—2TiO$_2$—2B$_2$O$_3$—1.5Co$_3$O$_4$ | [Co—30Cr—18.5Pt]—4SiO$_2$—2.5Co$_3$O$_4$ | [Co—26Cr—10.5Pt]—8SiO$_2$—2.5Co$_3$O$_4$ |

In order to investigate the microstructures of the recording layers in the samples produced, the cross-sectional structure of each sample was observed using a high-resolution transmission electron microscope (TEM). The observation samples were processed to make them very thin and then observed using a TEM, in such a way that adjacent crystal grains to the front and rear were not observed overlapping when seen from the observation direction. For the observation region, the cross-sectional structure that had been thinned to approximately 10 nm was observed. The mean values of the grain boundary width were then obtained from the resulting images. The grain boundary width was plotted taking the distance from the uppermost part of the fourth granular layer that was the uppermost layer in the oxide-containing layer as a function, and this is shown in FIG. 7.

In FIG. 7, the point at 12 nm on the horizontal axis denotes the grain boundary width in the lowermost layer of the recording layer, and the point at 0 on the horizontal axis denotes the grain boundary width in the uppermost part of the fourth granular layer. The uppermost part of the fourth granular layer was defined in the TEM images obtained as the line displaced from the medium surface in the substrate direction by the combined distance of the lubricant thickness, the protective film thickness and the ferromagnetic metal layer thickmal fly-height control (TFC). Touchdown power is the electrical power that is input until a TFC element attached to the slider of the head comes into contact with the medium surface. This means that the greater the TD value, the greater the planarity of the medium surface, because the head can be pushed down as far as the region of the medium surface.

As shown in Table 2, Example 1-1 had good magnetic cluster size, SFD and TD, so high SNR was demonstrated. For example, comparing Example 1-1 with Comparative Example 1-1, the SFD and TD are similar, but the magnetic cluster size is rather smaller. Without wishing to be bound to any particular theory, it is believed that this phenomenon is due to a material having a high oxide concentration is formed directly below the fourth granular layer, so the inter-grain exchange interaction of the fourth granular layer is reduced. Since the magnetic cluster size is reduced, the noise decreases, and as a result the SNR is improved. Furthermore, comparing Example 1-1 with Comparative Example 1-2, the magnetic cluster size and TD are similar, but SFD is rather lower. Without wishing to be bound to any particular theory, it is believed that this phenomenon to be due to a material having a low oxide concentration being formed in the second granular layer, producing fewer subgrains.

Meanwhile, comparing Comparative Example 1-3 and Example 1-1, the magnetic cluster sizes are similar, but the SFD and TD are poorer. As a result, good SNR could not be obtained in such embodiments. In particular, Comparative Example 3-1 had a larger grain boundary width in the uppermost part of the granular layer compared with the other samples. The grain boundary width in the uppermost part of the granular layer was large, and therefore the medium surface roughness increased, and it was believed that as a result, the TD power became smaller in embodiments such as Comparative Example 3-1, but this in no way binds the embodiments and approaches described herein to any particular theory regarding the cause of the decrease in TD power.

As can be seen and would be appreciated by one having ordinary skill in the art upon reading the above descriptions, it was possible to reduce the magnetic cluster size while maintaining good SFD and medium surface roughness in samples where the cross-sectional structure of the crystal grains as observed under a TEM was substantially as shown in FIG. 6. It is clear that, in such embodiments, good SNR could be achieved as a result.

Exemplary Embodiment 2

A sample was prepared by using the following materials for the granular layer 515 in the perpendicular magnetic recording medium according to Exemplary Embodiment 1. The materials and thicknesses of the layers other than the granular layer 515 were the same as described above in reference to Exemplary Embodiment 1. The first granular layer had a two-layer structure. The lower layer of the first granular layer was formed to a thickness of 0.5 nm under conditions of Ar gas pressure of approximately 4 Pa using an Ru-20Ti-10TiO$_2$ target. The upper layer of the first granular layer was formed to a thickness of 0.5 nm under conditions of Ar gas pressure of about 4 Pa and substrate bias −200 V, using a [Co-30Cr-18.5Pt)-6TiO$_2$-2.5Co$_3$O$_4$ target. The second granular layer was formed to a thickness of 4 nm under conditions of Ar gas pressure of about 4 Pa and substrate bias −200 V, using a [Co-22.5Pt-10.5Cr]-2SiO$_2$-2TiO$_2$-2B$_2$O$_3$-1.5Co$_3$O$_4$ target. For the third granular layer, samples of [Co-30Cr-18.5Pt]-7SiO$_2$-2.5Co$_3$O$_4$ were prepared with decreasing SiO$_2$ concentrations. Using these samples, the characteristics of the third granular layer when the oxide concentration was varied were investigated. The third granular layers were all formed to a thickness of 2 nm under conditions of Ar gas pressure of about 4 Pa. The fourth granular layer was formed to a thickness of 5 nm under conditions of Ar gas pressure of about 0.9 Pa using a [Co-26Cr-10.5Pt]-4SiO$_2$-1Co$_3$O$_4$ target. The materials of each granular layer and the oxide concentrations of these materials are collated in Table 3, shown below.

TABLE 3

| | 1st granular layer | | 2nd granular layer | |
|---|---|---|---|---|
| | Alloy | Oxide (at. %) | Alloy | Oxide (at. %) |
| Ex. 2-1 | Ru—20Ti—10—TiO$_2$ [Co—30Cr—18.5Pt]—6TiO$_2$—2.5Co$_3$O$_4$ | 9.7 | [Co—10.5Cr—22.5Pt]—2SiO$_2$—2TiO$_2$—2B$_2$O$_3$—1.5Co$_3$O$_4$ | 8.0 |
| Ex. 2-2 | Ru—20Ti—10—TiO$_2$ [Co—30Cr—18.5Pt]—6TiO$_2$—2.5Co$_3$O$_4$ | 9.7 | [Co—10.5Cr—22.5Pt]—2SiO$_2$—2TiO$_2$—2B$_2$O$_3$—1.5Co$_3$O$_4$ | 8.0 |
| Ex. 2-3 | Ru—20Ti—10—TiO$_2$ [Co—30Cr—18.5Pt]—6TiO$_2$—2.5Co$_3$O$_4$ | 9.7 | [Co—10.5Cr—22.5Pt]—2SiO$_2$—2TiO$_2$—2B$_2$O$_3$—1.5Co$_3$O$_4$ | 8.0 |
| Comp. Ex. 2-1 | Ru—20Ti—10—TiO$_2$ [Co—30Cr—18.5Pt]—6TiO$_2$—2.5Co$_3$O$_4$ | 9.7 | [Co—10.5Cr—22.5Pt]—2SiO$_2$—2TiO$_2$—2B$_2$O$_3$—1.5Co$_3$O$_4$ | 8.0 |
| Comp. Ex. 2-2 | Ru—20Ti—10—TiO$_2$ [Co—30Cr—18.5Pt]—6TiO$_2$—2.5Co$_3$O$_4$ | 9.7 | [Co—10.5Cr—22.5Pt]—2SiO$_2$—2TiO$_2$—2B$_2$O$_3$—1.5Co$_3$O$_4$ | 8.0 |

| | 3rd granular layer | | 4th granular layer | |
|---|---|---|---|---|
| | Alloy | Oxide (at. %) | Alloy | Oxide (at. %) |
| Ex. 2-1 | [Co—30Cr—18.5Pt]—7SiO$_2$—2.5Co$_3$O$_4$ | 10.3 | [Co—26Cr—10.5Pt]—4SiO$_2$—1Co$_3$O$_4$ | 5.3 |
| Ex. 2-2 | [Co—30Cr—18.5Pt]—6SiO$_2$—2.5Co$_3$O$_4$ | 9.3 | [Co—26Cr—10.5Pt]—4SiO$_2$—1Co$_3$O$_4$ | 5.3 |
| Ex. 2-3 | [Co—30Cr—18.5Pt]—5SiO$_2$—2.5Co$_3$O$_4$ | 8.3 | [Co—26Cr—10.5Pt]—4SiO$_2$—1Co$_3$O$_4$ | 5.3 |
| Comp. Ex. 2-1 | [Co—30Cr—18.5Pt]—4SiO$_2$—2.5Co$_3$O$_4$ | 7.3 | [Co—26Cr—10.5Pt]—4SiO$_2$—1Co$_3$O$_4$ | 5.3 |
| Comp. Ex. 2-2 | [Co—30Cr—18.5Pt]—3SiO$_2$—2.5Co$_3$O$_4$ | 6.3 | [Co—26Cr—10.5Pt]—4SiO$_2$—1Co$_3$O$_4$ | 5.3 |

As can be seen from Table 3, the Co$_3$O$_4$ contained in the targets is a compound that readily separates, and therefore it acts as an oxygen supply source, so Cr is oxidized to Cr$_2$O$_3$. This Cr$_2$O$_3$ segregates at the grain boundary and forms the grain boundary. When all of the oxygen in Co$_3$O$_4$ has been consumed to oxidize Cr, 4 molecules of Cr$_2$O$_3$ are produced for every 3 molecules of Co$_3$O$_4$ present in the mixture. The Cr$_2$O$_3$ formed in this way is also added to the oxide content. It should be noted that the first granular layer comprises two layers and the oxide concentration was obtained as the mean value, in the same way as described above in reference to Exemplary Embodiment 1. The cluster size, SFD, TD and SNR were measured by the same methods as described above in reference to Exemplary Embodiment 1.

The results are shown in FIGS. 8A-8B. When the oxide concentration of the third granular layer is increased, the SFD is largely unchanged, but the cluster size is considerably reduced at the 8.3 at % boundary. It should be noted here that when the oxide concentration of the third granular layer is increased from 7.3 at % to 8.3 at %, the oxide concentration of the third granular layer becomes larger than the oxide concentration of the second granular layer. One role of the third granular layer is to once again increase the grain boundary width. When the oxide concentration of the third granular layer is increased, the grain boundary width of the fourth granular layer that is formed as the layer above increases. Consequently, the magnetic cluster size decreases. As a result, the noise is reduced and the SNR is improved. This means that the oxide concentration of the third granular layer is preferably greater than the oxide concentration of the second granular layer, in some embodiments.

Exemplary Embodiment 3

Referring again to FIGS. 5-6, a sample was prepared by using the following materials for the granular layer 515 in the perpendicular magnetic recording medium according to Exemplary Embodiment 1. The materials and thicknesses of the layers other than the granular layer 515 were the same as described above in reference to Exemplary Embodiment 1. The first granular layer had a two-layer structure. The lower layer of the first granular layer was formed to a thickness of 0.5 nm under conditions of Ar gas pressure of about 4 Pa using a Ru-20Ti-10TiO$_2$ target. For the upper layer of the first granular layer samples of [Co-30Cr-18.5Pt]-6TiO$_2$-2.5Co$_3$O$_4$ were prepared with decreasing TiO$_2$ concentrations. Using these samples, the characteristics when the concentration of oxide contained in the first granular layer was varied were investigated. The upper layers of the first granular layers were all formed to a thickness of 0.5 nm under conditions of Ar gas pressure of about 4 Pa and substrate bias −200 V. The second granular layer was formed to a thickness of 4 nm under conditions of Ar gas pressure of about 4 Pa and substrate bias −200 V, using a [Co-22.5Pt-10.5Cr]-2SiO$_2$-2TiO$_2$-2B$_2$O$_3$-1.5Co$_3$O$_4$ target. The third granular layer was formed to a thickness of 2 nm under conditions of Ar gas pressure of about 4 Pa using a [Co-30Cr-18.5Pt]-6SiO$_2$-2.5Co$_3$O$_4$ target. The fourth granular layer was formed to a thickness of 5 nm under conditions of Ar gas pressure of about 0.9 Pa using a [Co-26Cr-10.5Pt]-4SiO$_2$-1Co$_3$O$_4$ target. The materials of each granular layer and the oxide concentrations of these materials are collated in Table 4, which is reproduced below. The cluster size, SFD, TD and SNR were measured by the same methods as described above in reference to Exemplary Embodiment 1.

the first granular layer becomes larger than the oxide concentration of the second granular layer. The first granular layer is the layer where the grain boundary starts to be formed in the initial layer of the recording layer, and has the role of increasing the grain boundary width of the second granular layer that is formed as the layer above. When the oxide concentration of the first granular layer is increased, there is good grain boundary formation, and the grain boundary width of the second granular layer that is formed as the layer above increases. Consequently, the magnetic cluster size decreases. As a result, the noise is the SNR is improved. This means that the oxide concentration of the first granular layer should be greater than the oxide concentration of the second granular layer at the very least.

Exemplary Embodiment 4

Referring again to FIGS. 5-6, a sample was prepared by using the following materials for the granular layer 515 in the perpendicular magnetic recording medium according to Exemplary Embodiment 1. The materials and thicknesses of the layers other than the granular layer 515 were the same as described above in reference to Exemplary Embodiment 1. The first granular layer had a two-layer structure. The lower layer of the first granular layer was formed to a thickness of 0.5 nm under conditions of Ar gas pressure of about 4 Pa using a Ru-20Ti-10TiO$_2$ target. The upper layer of the first granular layer was formed to a thickness of 0.5 nm under conditions of Ar gas pressure of about 4 Pa and substrate bias −200 V, using a [Co-30Cr-18.5Pt]-6TiO$_2$-2.5Co$_3$O$_4$, target. The second granular layer was formed to a thickness of 2 nm under conditions of Ar gas pressure of about 4 Pa and substrate bias −200 V, using a [Co-22.5Pt-10.5Cr]-2SiO$_2$-2TiO$_2$-2B$_2$O$_2$-

TABLE 4

| | | 1st granular layer | | 2nd granular layer | |
|---|---|---|---|---|---|
| | | Alloy | Oxide (at. %) | Alloy | Oxide (at. %) |
| Ex. 2-2 | Ru—20Ti—10—TiO$_2$ | [Co—30Cr—18.5Pt]—6TiO$_2$—2.5Co$_3$O$_4$ | 9.7 | [Co—10.5Cr—22.5Pt]—2SiO$_2$—2TiO$_2$—2B$_2$O$_3$—1.5Co$_3$O$_4$ | 8.0 |
| Ex. 3-1 | Ru—20Ti—10—TiO$_2$ | [Co—30Cr—18.5Pt]—5TiO$_2$—2.5Co$_3$O$_4$ | 9.2 | [Co—10.5Cr—22.5Pt]—2SiO$_2$—2TiO$_2$—2B$_2$O$_3$—1.5Co$_3$O$_4$ | 8.0 |
| Ex. 3-2 | Ru—20Ti—10—TiO$_2$ | [Co—30Cr—18.5Pt]—4TiO$_2$—2.5Co$_3$O$_4$ | 8.7 | [Co—10.5Cr—22.5Pt]—2SiO$_2$—2TiO$_2$—2B$_2$O$_3$—1.5Co$_3$O$_4$ | 8.0 |
| Ex. 3-3 | Ru—20Ti—10—TiO$_2$ | [Co—30Cr—18.5Pt]—3TiO$_2$—2.5Co$_3$O$_4$ | 8.2 | [Co—10.5Cr—22.5Pt]—2SiO$_2$—2TiO$_2$—2B$_2$O$_3$—1.5Co$_3$O$_4$ | 8.0 |
| Comp. Ex. 3-1 | Ru—20Ti—10—TiO$_2$ | [Co—30Cr—18.5Pt]—2TiO$_2$—2.5Co$_3$O$_4$ | 7.7 | [Co—10.5Cr—22.5Pt]—2SiO$_2$—2TiO$_2$—2B$_2$O$_3$—1.5Co$_3$O$_4$ | 8.0 |
| Comp. Ex. 3-2 | Ru—20Ti—10—TiO$_2$ | [Co—30Cr—18.5Pt]—2TiO$_2$—1Co$_3$O$_4$ | 6.7 | [Co—10.5Cr—22.5Pt]—2SiO$_2$—2TiO$_2$—2B$_2$O$_3$—1.5Co$_3$O$_4$ | 8.0 |

| | 3rd granular layer | | 4th granular layer | |
|---|---|---|---|---|
| | Alloy | Oxide (at. %) | Alloy | Oxide (at. %) |
| Ex. 2-2 | [Co—30Cr—18.5Pt]—6TiO$_2$—2.5Co$_3$O$_4$ | 9.3 | [Co—26Cr—10.5Pt]—4SiO$_2$—1Co$_3$O$_4$ | 5.3 |
| Ex. 3-1 | [Co—30Cr—18.5Pt]—6TiO$_2$—2.5Co$_3$O$_4$ | 9.3 | [Co—26Cr—10.5Pt]—4SiO$_2$—1Co$_3$O$_4$ | 5.3 |
| Ex. 3-2 | [Co—30Cr—18.5Pt]—6TiO$_2$—2.5Co$_3$O$_4$ | 9.3 | [Co—26Cr—10.5Pt]—4SiO$_2$—1Co$_3$O$_4$ | 5.3 |
| Ex. 3-3 | [Co—30Cr—18.5Pt]—6TiO$_2$—2.5Co$_3$O$_4$ | 9.3 | [Co—26Cr—10.5Pt]—4SiO$_2$—1Co$_3$O$_4$ | 5.3 |
| Comp. Ex. 3-1 | [Co—30Cr—18.5Pt]—6TiO$_2$—2.5Co$_3$O$_4$ | 9.3 | [Co—26Cr—10.5Pt]—4SiO$_2$—1Co$_3$O$_4$ | 5.3 |
| Comp. Ex. 3-2 | [Co—30Cr—18.5Pt]—6TiO$_2$—2.5Co$_3$O$_4$ | 9.3 | [Co—26Cr—10.5Pt]—4SiO$_2$—1Co$_3$O$_4$ | 5.3 |

The results are shown in FIGS. 9A-9B. When the oxide concentration of the first granular layer is increased, the SFD is largely unchanged, but the cluster size is considerably reduced at the 8.2 at % boundary. It should be noted here that when the oxide concentration of the first granular layer is increased from 7.7 at % to 8.2 at %, the oxide concentration of 1.5Co$_3$O$_4$ target. The third granular layer was formed to a thickness of 2 nm under conditions of Ar gas pressure of about 4 Pa using a [Co-30Cr-18.5Pt]-6SiO$_2$-2.5Co$_3$O$_4$ target. For the fourth granular layer, samples of [Co-26Cr-10.5Pt]-2SiO$_2$-1Co$_3$O$_4$ were prepared with increasing SiO$_2$ concentration. Using these samples, the characteristics of the fourth granular layer when the oxide concentration was varied were investigated. The fourth granular layers were all formed to a thickness of 5 nm under conditions of Ar gas pressure of about 0.9 Pa. The materials of each granular layer and the oxide concentrations of these materials are collated in Table 5, which is reproduced below. The cluster size, SFD, TD and SNR were measured by the same methods as described above in reference to Exemplary Embodiment 1.

the surface roughness. Therefore, if the oxide concentration of the fourth granular layer is greater than the oxide concentration of the third granular layer, the TD deteriorates. Increased SFD and poorer TD cause the SNR to deteriorate. The oxide concentration of the fourth granular layer therefore may to be lower than the oxide concentration of the third granular layer, in preferred embodiments.

TABLE 5

| | 1st granular layer | | 2nd granular layer | |
|---|---|---|---|---|
| | Alloy | Oxide (at. %) | Alloy | Oxide (at. %) |
| Ex. 4-1 | Ru—20Ti—10—$TiO_2$ | [Co—30Cr—18.5Pt]—$6TiO_2$—$2.5Co_3O_4$ | 9.7 | [Co—10.5Cr—22.5Pt]—$2SiO_2$—$2TiO_2$—$2B_2O_3$—$1.5Co_3O_4$ | 8.0 |
| Ex. 2-2 | Ru—20Ti—10—$TiO_2$ | [Co—30Cr—18.5Pt]—$6TiO_2$—$2.5Co_3O_4$ | 9.7 | [Co—10.5Cr—22.5Pt]—$2SiO_2$—$2TiO_2$—$2B_2O_3$—$1.5Co_3O_4$ | 8.0 |
| Ex. 4-2 | Ru—20Ti—10—$TiO_2$ | [Co—30Cr—18.5Pt]—$6TiO_2$—$2.5Co_3O_4$ | 9.7 | [Co—10.5Cr—22.5Pt]—$2SiO_2$—$2TiO_2$—$2B_2O_3$—$1.5Co_3O_4$ | 8.0 |
| Comp. Ex. 4-1 | Ru—20Ti—10—$TiO_2$ | [Co—30Cr—18.5Pt]—$6TiO_2$—$2.5Co_3O_4$ | 9.7 | [Co—10.5Cr—22.5Pt]—$2SiO_2$—$2TiO_2$—$2B_2O_3$—$1.5Co_3O_4$ | 8.0 |
| Comp. Ex. 4-2 | Ru—20Ti—10—$TiO_2$ | [Co—30Cr—18.5Pt]—$6TiO_2$—$2.5Co_3O_4$ | 9.7 | [Co—10.5Cr—22.5Pt]—$2SiO_2$—$2TiO_2$—$2B_2O_3$—$1.5Co_3O_4$ | 8.0 |

| | 3rd granular layer | | 4th granular layer | |
|---|---|---|---|---|
| | Alloy | Oxide (at. %) | Alloy | Oxide (at. %) |
| Ex. 4-1 | [Co—30Cr—18.5Pt]—$6TiO_2$—$2.5Co_3O_4$ | 9.3 | [Co—26Cr—10.5Pt]—$2SiO_2$—$1Co_3O_4$ | 3.3 |
| Ex. 2-2 | [Co—30Cr—18.5Pt]—$6TiO_2$—$2.5Co_3O_4$ | 9.3 | [Co—26Cr—10.5Pt]—$4SiO_2$—$1Co_3O_4$ | 5.3 |
| Ex. 4-2 | [Co—30Cr—18.5Pt]—$6TiO_2$—$2.5Co_3O_4$ | 9.3 | [Co—26Cr—10.5Pt]—$6SiO_2$—$1Co_3O_4$ | 7.3 |
| Comp. Ex. 4-1 | [Co—30Cr—18.5Pt]—$6TiO_2$—$2.5Co_3O_4$ | 9.3 | [Co—26Cr—10.5Pt]—$8SiO_2$—$1Co_3O_4$ | 9.3 |
| Comp. Ex. 4-2 | [Co—30Cr—18.5Pt]—$6TiO_2$—$2.5Co_3O_4$ | 9.3 | [Co—26Cr—10.5Pt]—$10SiO_2$—$1Co_3O_4$ | 11.3 |

The results are shown in FIGS. 10A-10B. When the oxide concentration of the fourth granular layer is increased, the magnetic cluster size decreases at a flat rate. On the other hand, when the oxide concentration of the fourth granular layer is 9.3 at % or greater, the SFD considerably increases. It should be noted here that when the oxide concentration of the fourth granular layer is higher than 9.3 at %, the oxide concentration of the fourth granular oxide concentration of layer becomes larger than the third granular layer. In addition, the fourth granular layer is a main recording layer and is relatively thick. When the high-oxide concentration layer is made thicker, the oxide readily penetrates the magnetic grain cores, so there are more subgrains. Subgrains disturb the grain structure, and therefore there is larger distribution in the grain size and magnetic anisotropy. Furthermore, when the third granular layer is formed by a material having lower oxide concentration than the fourth granular layer, the number of subgrains increases further. Consequently, if the oxide concentration of the fourth granular layer is greater than the oxide concentration of the third granular layer, the SFD is greatly increased. The conversion of magnetic grains to subgrains also increases Exemplary Embodiment 5

Referring again to FIGS. 5-6, a sample was prepared by using the following materials for the granular layer 515 in the perpendicular magnetic recording medium according to Exemplary Embodiment 1. The materials and thicknesses of the layers other than the granular layer 515 were the same as described above in reference to Exemplary Embodiment 1. The first granular layer had a two-layer structure. The lower layer of the first granular layer was formed to a thickness of 0.5 nm under conditions of Ar gas pressure of about 4 Pa using an Ru-20Ti-$10TiO_2$ target. The upper layer of the first granular layer was formed to a thickness of 0.5 nm under conditions of Ar gas pressure of about 4 Pa and substrate bias −200 V, using a [Co-30Cr-18.5Pt]-$6TiO_2$-$2.5Co_3O_4$ target. The second granular layer was formed to a thickness of 4 nm under conditions of Ar gas pressure of about 4 Pa and substrate bias −200 V, using the target shown in Table 6. The third granular layer was formed to a thickness of 2 nm under conditions of Ar gas pressure of about 4 Pa using a [Co-30Cr-18.5Pt]-$6SiO_2$-$2.5Co_3O_4$ target. The fourth granular layer was formed to a thickness of 5 nm under conditions of Ar gas pressure of about 0.9 Pa using a target as shown below in Table 6.

TABLE 6

| | 2nd granular layer | | 4th granular layer | | OW (−dB) | SNR (dB) |
|---|---|---|---|---|---|---|
| | Alloy | X | Alloy | X | | |
| Ex. 2-2 | [Co—10.5Cr—22.5Pt]—$2SiO_2$—$2TiO_2$—$2B_2O_3$—$1.5Co_3O_4$ | 2.14 | [Co—26Cr—10.5Pt]—$4SiO_2$—$1Co_3O_4$ | 0.4 | 28.2 | 18.5 |
| Ex. 5-1 | [Co—14.5Cr—22.5Pt]—$2SiO_2$—$2TiO_2$—$2B_2O_3$—$1.5Co_3O_4$ | 1.55 | [Co—26Cr—14.5Pt]—$4SiO_2$—$1Co_3O_4$ | 0.56 | 27.8 | 18.2 |
| Comp. Ex. 5-1 | [Co—26Cr—14.5Pt]—$2SiO_2$—$2TiO_2$—$2B_2O_3$—$1.5Co_3O_4$ | 0.56 | [Co—14.5Cr—22.5Pt]—$4SiO_2$—$1Co_3O_4$ | 1.55 | 21.3 | 16.2 |
| Comp. Ex. 5-2 | [Co—26Cr—10.5Pt]—$2SiO_2$—$2TiO_2$—$2B_2O_3$—$1.5Co_3O_4$ | 0.40 | [Co—10.5Cr—22.5Pt]—$4SiO_2$—$1Co_3O_4$ | 2.14 | 20.1 | 15.3 |

Table 6 shows the ratio X of the Pt concentration and Cr concentration (Pt concentration/Cr concentration) of the targets used to form the second and fourth granular layers, and also the read/write properties Overwrite (OW) and SNR were obtained by methods as in the read/write results evaluation described above in reference to Exemplary Embodiment 1. In general, a greater OW value denotes better writeability.

According to the results in Table 6, when X in the fourth granular layer is smaller than X in the second granular layer, good OW is demonstrated and the SNR is high. However, when X in the fourth granular layer is greater than X in the second granular layer, OW is greatly reduced and the SNR deteriorates. Accordingly, X in the fourth granular layer may be lower than X in the second granular layer, according to preferred embodiments.

A sample was then prepared by using the following materials for the granular layer 515 in the perpendicular magnetic recording medium according to Exemplary Embodiment 1.

The materials and thicknesses of the layers other than the granular layer 515 were substantially the same as described above in reference to Exemplary Embodiment 1. The first granular layer had a two-layer structure. The lower layer of the first granular layer was formed to a thickness of 0.5 nm under conditions of Ar gas pressure of about 4 Pa using an Ru-20Ti-10TiO$_2$ target. The upper layer of the first granular layer was formed to a thickness of 0.5 nm under conditions of Ar gas pressure of about 4 Pa and substrate bias –200 V, using a [Co-30Cr-18.5Pt]-6TiO$_2$-2.5Co$_3$O$_4$ target. The second granular layer was formed to a thickness of 4 nm under conditions of Ar gas pressure of about 4 Pa and substrate bias –200 V, using a [Co-10.5Cr-22.5Pt]-2SiO$_2$-2TiO$_2$-2B$_2$O$_3$-1.5Co$_3$O$_4$ target. The Cr concentration in the third granular layer was varied in the manner shown below in Table 7. The third granular layer was formed to a thickness of 2 nm under conditions of Ar gas pressure of about 4 Pa. The fourth granular layer was formed to a thickness of 5 nm under conditions of Ar gas pressure of about 0.9 Pa using a [Co-26Cr-10.5Pt]-4SiO$_2$-1Co$_3$O$_4$ target.

Table 7, above, shows the Cr concentration of the targets used to form the third and fourth granular layers, and also the read/write properties results. According to the results in Table 7, when the Cr concentration in the third granular layer is smaller than the Cr concentration in the fourth granular layer, good OW is demonstrated and the SNR is high. However, when the Cr concentration in the third granular layer is at or above the Cr concentration in the fourth granular layer, OW is greatly reduced and the SNR deteriorates. Accordingly, the Cr concentration in the third granular layer has to be lower than the Cr concentration in the fourth granular layer.

At this point, in order to investigate the relationship between X and magnetic anisotropy (Ku), and the relationship between Cr concentration and saturation magnetization (Ms), samples were prepared in which a granular recording layer was formed to 13 nm on the intermediate layer 514 as a single-layered structure, and the magnetic anisotropy was evaluated.

TABLE 8

| | Alloy | Cr (at. %) | X |
|---|---|---|---|
| Ex. 7-1 | [Co—30Cr—18.5Pt]—6SiO$_2$—2.5Co$_3$O$_4$ | 30 | 0.62 |
| Ex. 7-2 | [Co—28Cr—18.5Pt]—4SiO$_2$—2.5Co$_3$O$_4$ | 28 | 0.66 |
| Ex. 7-3 | [Co—27Cr—18Pt]—4SiO$_2$—1Co$_3$O$_4$ | 27 | 0.67 |
| Ex. 7-4 | [Co—26Cr—18.5Pt]—4SiO$_2$—2.5Co$_3$O$_4$ | 26 | 0.71 |
| Ex. 7-5 | [Co—25Cr—18.5Pt]—4SiO$_2$—1Co$_3$O$_4$ | 25 | 0.74 |
| Ex. 7-6 | [Co—23Cr—18Pt]—5SiO$_2$—1Co$_3$O$_4$ | 23 | 0.78 |
| Ex. 7-7 | [Co—17.5Cr—18.5Pt]—4SiO$_2$—4TiO$_2$—1.5Co$_3$O$_4$ | 17.5 | 1.05 |
| Ex. 7-8 | [Co—14.5Cr—22.5Pt]—1SiO$_2$—1TiO$_2$—2B$_2$O$_3$—1.5Co$_3$O$_4$ | 14.5 | 1.55 |
| Ex. 7-9 | [Co—10.5Cr—22.5Pt]—1SiO$_2$—1TiO$_2$—2B$_2$O$_3$—1.5Co$_3$O$_4$ | 10.5 | 2.14 |

Figure 12:
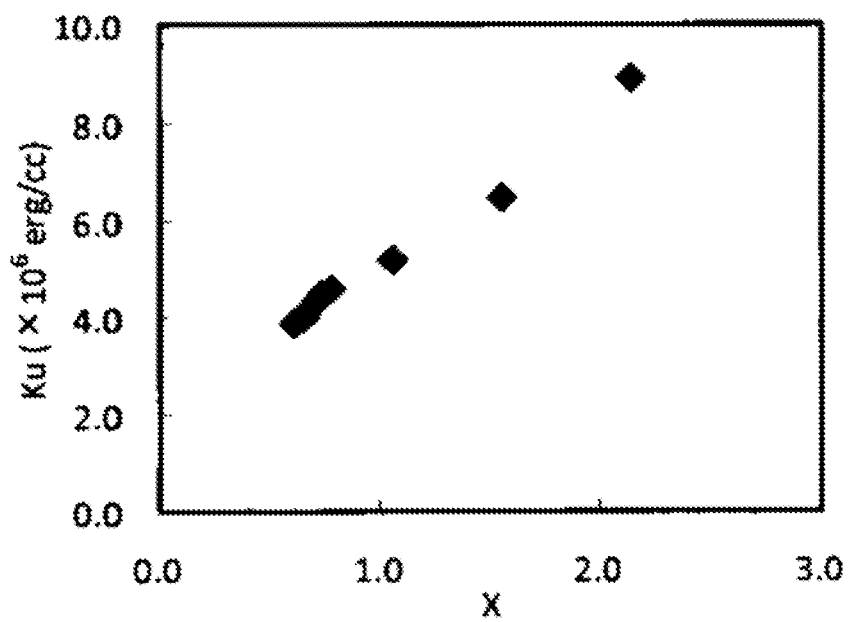
FIG. 12 shows a relationship between the Pt and Cr concentration ratio and the magnetic anisotropy, according to one embodiment.

The materials shown above in Table 8 were prepared for the granular recording layer, with X and the Cr concentration being varied. The saturation magnetization was determined using a vibrating sample magnetometer (VSM). The magnetic anisotropy was obtained from the magnetic field angular dependence of the torque and the torque was measured by using a torque magnetometer. The saturation magnetization was obtained as the saturation magnetization of the magnetic grain cores. Specifically, the measured saturation magnetization multiplied by the portion of the magnetic grain cores was taken as magnetization of the inside of the magnetic grains. The volume of the magnetic grain cores was taken as the value of the volume of oxide contained therein, subtracted from the overall film volume. The magnetic anisotropy was likewise obtained as the magnetic anisotropy inside the magnetic grain cores. The results obtained are shown in FIGS. 11 and 12. As shown in FIG. 11, it can be seen that when the Cr concentration increases, the saturation magnetization decreases at a flat rate. Furthermore, FIG. 12 shows that when the ratio X of the Pt concentration and Cr concentration increases, the magnetic anisotropy increases at a flat rate.

TABLE 7

| | 3rd granular layer | | 4th granular layer | | | |
|---|---|---|---|---|---|---|
| | Alloy | Cr (at. %) | Alloy | Cr (at. %) | OW (–dB) | SNR (dB) |
| Ex. 6-1 | [Co—32Cr—18.5Pt]—6SiO$_2$—2.5Co$_3$O$_4$ | 32 | [Co—26Cr—10.5Pt]—4SiO$_2$—1Co$_3$O$_4$ | 26 | 28.5 | 18.5 |
| Ex. 2-2 | [Co—30Cr—18.5Pt]—6SiO$_2$—2.5Co$_3$O$_4$ | 30 | [Co—26Cr—10.5Pt]—4SiO$_2$—1Co$_3$O$_4$ | 26 | 28.2 | 18.5 |
| Ex. 6-2 | [Co—28Cr—18.5Pt]—6SiO$_2$—2.5Co$_3$O$_4$ | 28 | [Co—26Cr—10.5Pt]—4SiO$_2$—1Co$_3$O$_4$ | 26 | 28.0 | 18.3 |
| Comp. Ex. 6-1 | [Co—26Cr—18.5Pt]—6SiO$_2$—2.5Co$_3$O$_4$ | 26 | [Co—26Cr—10.5Pt]—4SiO$_2$—1Co$_3$O$_4$ | 26 | 25.0 | 17.3 |
| Comp. Ex. 6-2 | [Co—24Cr—18.5Pt]—6SiO$_2$—2.5Co$_3$O$_4$ | 24 | [Co—26Cr—10.5Pt]—4SiO$_2$—1Co$_3$O$_4$ | 26 | 23.0 | 16.4 |

Exemplary Embodiment 6

Referring again to FIGS. 5-6, a sample was prepared by using the following materials for the granular layer 515 in the perpendicular magnetic recording medium according to Exemplary Embodiment 1. The materials and thicknesses of the layers other than the granular layer 515 were the same as described above in reference to Exemplary Embodiment 1. The first granular layer was formed to a variety of thicknesses as shown below in Table 9, and under conditions of Ar gas pressure of about 4 Pa and substrate bias −200 V using a [Co-30Cr-18.5Pt]-6TiO$_2$-2.5Co$_3$O$_4$ target.

TABLE 9

| | 1st granular layer | Thickness (nm) |
|---|---|---|
| Ex. 8-1 | [Co—30Cr—18.5Pt]—6TiO$_2$—2.5Co$_3$O$_4$ | 0.50 |
| Ex. 8-2 | [Co—30Cr—18.5Pt]—6TiO$_2$—2.5Co$_3$O$_4$ | 1.00 |
| Ex. 8-3 | [Co—30Cr—18.5Pt]—6TiO$_2$—2.5Co$_3$O$_4$ | 2.00 |
| Ex. 8-4 | [Co—30Cr—18.5Pt]—6TiO$_2$—2.5Co$_3$O$_4$ | 3.00 |
| Comp. Ex. 8-1 | [Co—30Cr—18.5Pt]—6TiO$_2$—2.5Co$_3$O$_4$ | 0.00 |
| Comp. Ex. 8-2 | [Co—30Cr—18.5Pt]—6TiO$_2$—2.5Co$_3$O$_4$ | 4.00 |

The second granular layer was formed to a thickness of 3.7 nm under conditions of Ar gas pressure of about 4 Pa and substrate bias −200 V, using a [Co-22.5Pt-10.5Cr]-1SiO$_2$-1TiO$_2$-2B$_2$O$_3$-1.5Co$_3$O$_4$ target. The third granular layer was formed to a thickness of 2 nm under conditions of Ar gas pressure of about 4 Pa using a [Co-30Cr-18.5Pt]-6SiO$_2$-2.5Co$_3$O$_4$ target. The fourth granular layer was formed to a thickness of 5 nm under conditions of Ar gas pressure of about 0.9 Pa using a [Co-26Cr-10.5Pt]-4SiO$_2$-1Co$_3$O$_4$ target. The magnetic cluster size, SFD and magnetic read/write properties were measured using the same methods as described above in reference to Exemplary Embodiments 1-5.

Figure 13:
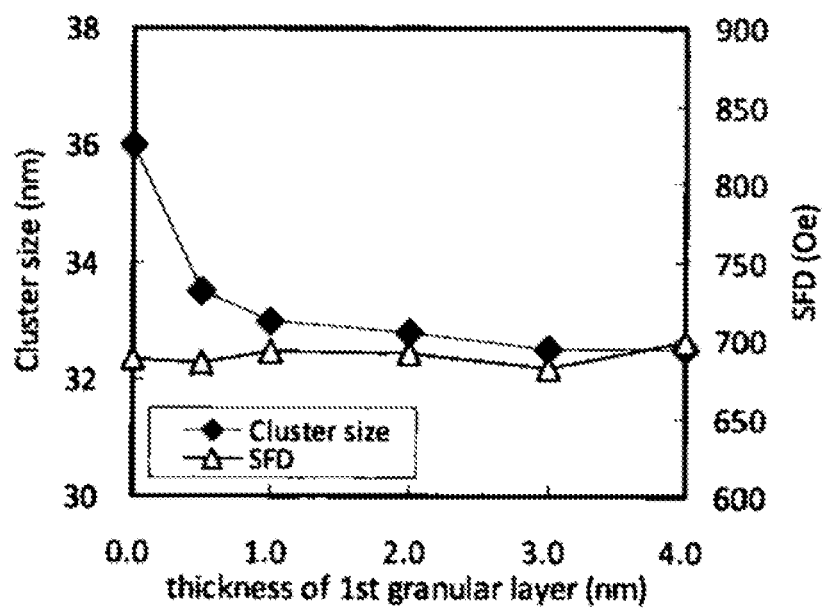
FIG. 13 shows a relationship between the thickness of the first granular layer and magnetic characteristics, according to one embodiment.
Figure 14:
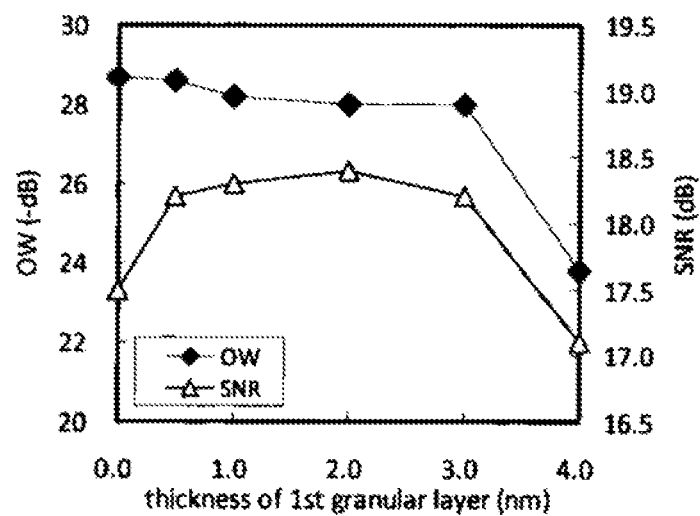
FIG. 14 shows a relationship between the thickness of the first granular layer and read/write properties, according to one embodiment.

FIG. 13 shows the magnetic cluster size and SFD results. FIG. 14 shows the OW and SNR results. The point where the first granular layer thickness is 0 nm shows the result for a medium which was formed without a first granular layer. As can be seen from the results in FIG. 13, it is clear that when the first granular layer is formed to 0.5 nm or greater, the magnetic cluster size decreases. This is believed to be because the high-oxide-concentration first granular layer leads the grain boundary width to increase. On the other hand, when a first granular layer was not formed, the SNR deteriorated. The reason for this is believed to be that the increased magnetic cluster size caused increased noise. In addition, FIG. 14 shows that when the thickness of the first granular layer is greater than 3 nm, OW decreases and SNR deteriorates. This is believed to be due to the fact that the effective head field is reduced because the total thickness of the recording layer is greater. The thickness of the first granular layer is therefore preferably between 0.5 nm and 3 nm.

Exemplary Embodiment 7

Referring again to FIGS. 5-6, a sample was prepared by using the following materials for the granular layer 515 in the perpendicular magnetic recording medium according to Exemplary Embodiment 1. The materials and thicknesses of the layers other than the granular layer 515 were the same as described above in reference to Exemplary Embodiment 1. The first granular layer was formed to a thickness of 1 nm, under conditions of Ar gas pressure of about 4 Pa and substrate bias −200 V using a [Co-30Cr-18.5Pt]-6TiO$_2$-2.5Co$_3$O$_4$ target. The second granular layer was formed to a thickness of 3.7 nm under conditions of Ar gas pressure of about 4 Pa and substrate bias −200 V, using a [Co-22.5Pt-10.5Cr]-1SiO$_2$-1TiO$_2$-2B$_2$O$_3$-1.5Co$_3$O$_4$ target. The third granular layer was formed to a varying thickness, as shown in Table 10, below under conditions of Ar gas pressure of about 4 Pa using a [Co-30Cr-18.5Pt]-6SiO$_2$-2.5Co3O$_4$ target. The fourth granular layer was formed to a thickness of 5 nm under conditions of Ar gas pressure of about 0.9 Pa using a [Co-26Cr-10.5Pt]-4SiO$_2$-1Co$_3$O$_4$ target. The magnetic cluster size, SFD and magnetic read/write properties were measured using the same methods as described above in reference to Exemplary Embodiments 1-5.

TABLE 10

| | 3rd granular layer | Thickness (nm) |
|---|---|---|
| Ex. 9-1 | [Co—30Cr—18.5Pt]—6SiO$_2$—2.5Co$_3$O$_4$ | 1.00 |
| Ex. 8-2 | [Co—30Cr—18.5Pt]—6SiO$_2$—2.5Co$_3$O$_4$ | 2.00 |
| Ex. 9-2 | [Co—30Cr—18.5Pt]—6SiO$_2$—2.5Co$_3$O$_4$ | 3.00 |
| Ex. 9-3 | [Co—30Cr—18.5Pt]—6SiO$_2$—2.5Co$_3$O$_4$ | 4.00 |
| Comp. Ex. 9-1 | [Co—30Cr—18.5Pt]—6SiO$_2$—2.5Co$_3$O$_4$ | 0.00 |
| Comp. Ex. 9-2 | [Co—30Cr—18.5Pt]—6SiO$_2$—2.5Co$_3$O$_4$ | 0.50 |
| Comp. Ex. 9-3 | [Co—30Cr—18.5Pt]—6SiO$_2$—2.5Co$_3$O$_4$ | 5.00 |

Figure 15:
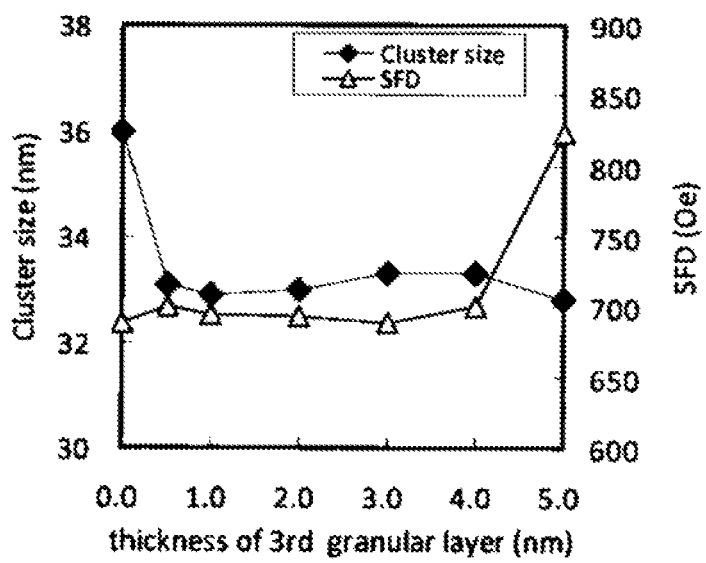
FIG. 15 shows a relationship between the thickness of the third granular layer and magnetic characteristics, according to one embodiment.
Figure 16:
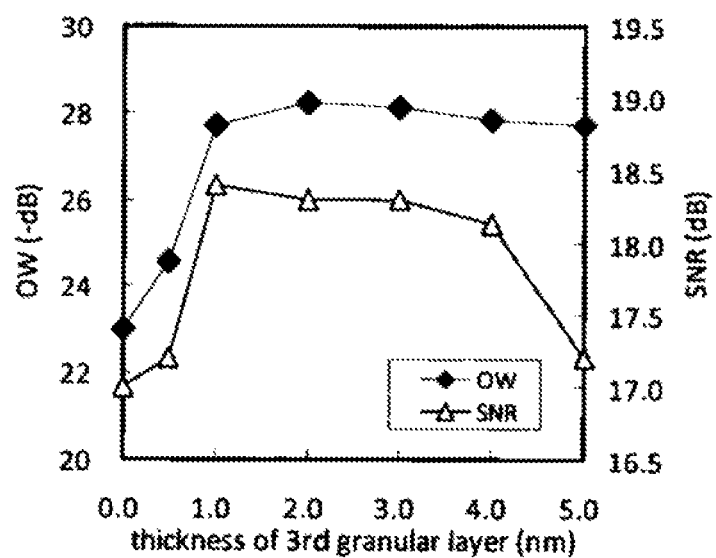
FIG. 16 shows a relationship between the thickness of the third granular layer and read/write properties, according to one embodiment.

FIG. 15 shows the OW and SNR results. The point where the third granular layer thickness is 0.00 nm shows the result for a medium that was formed without a third granular layer. As can be seen from the results in FIG. 15, it is clear that when the third granular layer is formed to 0.5 nm or greater, the magnetic cluster size decreases. This is believed to be because the high-oxide-concentration third granular layer caused the grain boundary width of the fourth granular layer to increase. However, the embodiments and approaches described herein are not bound to any particular theory, and as shown in FIG. 16, in order to achieve good OW, the thickness of the third granular layer may be at least 1 nm.

If the thickness layer is less than 1 nm, the inter-layer exchange interaction of the fourth granular layer and the second granular layer is too intense, so incoherent rotation of magnetization does not readily proceed. The third granular layer is preferably at least 1 nm with regard to the SNR too. Furthermore, if the thickness of the third granular layer is 5 nm or more, the SFD increases and the SNR becomes extremely poor. This is believed to be because if the thickness of the high-oxide-concentration third granular layer is too great, there are more subgrains. If there are more subgrains, there is greater distribution in the grain size and magnetic anisotropy, and the SFD increases as a result. It is therefore clear that the thickness of the third granular layer is preferably between 1 nm and 4 nm.

The above results imply that the third granular layer has the role of controlling the inter-layer exchange interaction of the fourth granular layer and the second granular layer, as well as the role of increasing the grain boundary width in the fourth granular layer. It should therefore be noted that the role of the third granular layer is clearly different from the role of the first granular layer, in some approaches.

Exemplary Embodiment 8

Referring again to FIGS. 5-6, a sample was prepared by using the following materials for the granular layer 515 in the perpendicular magnetic recording medium according to Exemplary Embodiment 1. The materials and thicknesses of the layers other than the granular layer 515 were the same as described above in reference to Exemplary Embodiment 1.

The first granular layer was formed to a thickness of 1 nm, under conditions of Ar gas pressure of approximately 4 Pa and substrate bias −200 V using a [Co-30Cr-18.5Pt]-6TiO$_2$-2.5Co$_3$O$_4$ target. The second granular layer was formed to a thickness of 3.7 nm under conditions of Ar gas pressure of approximately 4 Pa and substrate bias −200 V, using a [Co-22.5Pt-10.5Cr]-1SiO$_2$-1TiO$_2$-2B$_2$O$_3$-1.5Co$_3$O$_4$ target. The third granular layer was formed using a target in which the type of oxide and added elements were varied, as shown in Table 11, below. The third granular layer was formed to a thickness of 2 nm under conditions of Ar gas pressure of approximately 4 Pa. The fourth granular layer was formed to a thickness of 5 nm under conditions of Ar gas pressure of about 0.9 Pa using a [Co-10.5Pt-26Cr]-4SiO$_2$-1Co$_3$O$_4$ target. The magnetic cluster size, SFD and the read/write properties were measured using the same methods as described above in reference to Exemplary Embodiments 1 to 5. As shown in Table 11, all of the samples exhibited a small magnetic cluster size and low SFD, and good read/write properties.

TABLE 11

| | 3rd granular layer | Cluster size (nm) | SFD (Oe) | OW (−dB) | SNR (dB) |
|---|---|---|---|---|---|
| Ex. 8-2 | [Co—30Cr—18.5Pt]—6SiO$_2$—2.5Co$_3$O$_4$ | 33.0 | 693 | 28.2 | 18.3 |
| Ex. 10-1 | [Co—30Cr—18.5Pt]—3SiO$_2$—3SiO$_2$—2.5Co$_3$O$_4$ | 32.7 | 705 | 28.0 | 18.6 |
| Ex. 10-2 | [Co—30Cr—18.5Pt]—2SiO$_2$—2TiO$_2$—2B$_2$O$_3$—2.5Co$_3$O$_4$ | 33.2 | 688 | 28.1 | 18.5 |
| Ex. 10-3 | [Co—30Cr—18.5Pt]—2SiO$_2$—2TiO$_2$—2Ta$_2$O$_5$—2.5Co$_3$O$_4$ | 33.1 | 695 | 27.9 | 18.0 |
| Ex. 10-4 | [Co—30Cr—18.5Pt]—2SiO$_2$—2TiO$_2$—2Cr$_2$O$_3$—2.5Co$_3$O$_4$ | 32.9 | 698 | 28.0 | 18.1 |
| Ex. 10-5 | [Co—30Cr—13.5Pt—5Ru]—6SiO$_2$—2.5Co$_3$O$_4$ | 33.0 | 702 | 28.8 | 18.4 |

It was thus possible to improve the overwrite characteristics while maintaining a high medium SNR by using a magnetic head formed with a shield around the main pole of the recording part, and it was possible to confirm operation at 121 megabits per square centimeter with a linear recording density of 728,000 bits/cm and a track density of 167,000 tracks/cm, according to some embodiments.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording medium, comprising:
    an oxide recording layer comprising an oxide; and
    a non-oxide recording layer which does not contain an oxide positioned above the oxide recording layer,
    wherein the oxide recording layer comprises:
        a region R1 where a grain boundary width in a direction parallel to a plane of formation of the region R1 increases therealong from a lowermost portion of the oxide recording layer toward a medium surface;
        at least one region R3 positioned above the region R1, and wherein a grain boundary width increases therealong toward the medium surface;
        at least one region R2 where a grain boundary width of the region R2 decreases therealong from the region R1 to the region R3, the at least one region R2 being positioned between the region R1 and the region R3; and
        at least one region R4 where a grain boundary width of the region R4 decreases therealong from the region R3 toward the medium surface, the at least one region R4 being positioned above the region R3 and near an uppermost portion of the oxide recording layer,
    wherein a magnetic grain in the region R4 is physically characterized by growth directly on a magnetic grain in the region R3, the magnetic grain in the region R3 being physically characterized by growth directly on a magnetic grain in the region R2, the magnetic grain in the region R2 being physically characterized by growth directly on the a magnetic grain in the region R1.

2. The perpendicular magnetic recording medium as recited in claim 1, wherein a thickness of the region R1 in a direction perpendicular to the plane of formation thereof is between about 0.5 nm and about 3.0 nm, and wherein a thickness of the region R3 in the direction perpendicular to the plane of formation thereof is between about 1.0 nm and about 4.0 nm.

3. The perpendicular magnetic recording medium as recited in claim 1, wherein a magnetic anisotropy energy of the region R4 is smaller than a magnetic anisotropy energy of the region R2.

4. The perpendicular magnetic recording medium as recited in claim 3, wherein a saturation magnetization of the region R3 is lower than a saturation magnetization of the region R4.

5. The perpendicular magnetic recording medium as recited in claim 1, wherein a ratio of concentrations of Pt and Cr in the region R4 (Pt concentration/Cr concentration) is smaller than a ratio of concentrations of Pt and Cr in the region R2.

6. The perpendicular magnetic recording medium as recited in claim 5, wherein a saturation magnetization of the region R3 is lower than a saturation magnetization of the region R4.

7. The perpendicular magnetic recording medium as recited in claim 5, wherein a Cr concentration in the region R3 is greater than a Cr concentration in the region R4.

8. A magnetic data storage system, comprising:
    at least one magnetic head;
    a perpendicular magnetic recording medium as recited in claim 1;
    a drive mechanism for passing the magnetic recording medium over the at least one magnetic head; and
    a controller electrically coupled to the at least one magnetic head for controlling operation of the at least one magnetic head.

9. The perpendicular magnetic recording medium as recited in claim 1, wherein the region R1 includes a first plurality of magnetic grains, the region R2 includes a second plurality of magnetic grains, the region R3 includes a third plurality of magnetic grains, and the region R4 includes a fourth plurality of magnetic grains.

10. The perpendicular magnetic recording medium as recited in claim 9, wherein a thickness of the first plurality of magnetic grains in a direction perpendicular to the plane of formation of the region R1 is equal to a thickness of the region R1 in a direction perpendicular to the plane of formation of the region R1.

11. The perpendicular magnetic recording medium as recited in claim 10, wherein each interface between adjacent magnetic grains and grain boundaries in the region R1 is characterized as having a constant slope that extends throughout an entirety of the thickness of the region R1 from a lowermost portion of the region R1 to an uppermost portion of the region R1.

12. The perpendicular magnetic recording medium as recited in claim 11, wherein the grain boundary width between adjacent magnetic grains in the uppermost portion of the region R1 is greater than the grain boundary width between adjacent magnetic grains in the lowermost portion of the region R1.

13. The perpendicular magnetic recording medium as recited in claim 9, wherein a thickness of the second plurality of magnetic grains in direction perpendicular to a plane of formation of the region R2 is equal to a thickness of the region R2 in a direction perpendicular to the plane of formation of the region R2.

14. The perpendicular magnetic recording medium as recited in claim 13, wherein each interface between adjacent magnetic grains and grain boundaries in the region R2 is characterized as having a constant slope that extends throughout an entirety of the thickness of the region R2 from a lowermost portion of the region R2 to an uppermost portion of the region R2.

15. The perpendicular magnetic recording medium as recited in claim 14, wherein the grain boundary width between adjacent magnetic grains in the uppermost portion of the region R2 is less than the grain boundary width between adjacent magnetic grains in the lowermost portion of the region R2.

16. The perpendicular magnetic recording medium as recited in claim 9, wherein a thickness of the third plurality of magnetic grains in direction perpendicular to a plane of formation of the region R3 is equal to a thickness of the region R3 in a direction perpendicular to the plane of formation of the region R3.

17. The perpendicular magnetic recording medium as recited in claim 16, wherein each interface between adjacent magnetic grains and grain boundaries in the region R3 is characterized as having a constant slope that extends throughout an entirety of the thickness of the region R3 from a lowermost portion of the region R3 to an uppermost portion of the region R3.

18. The perpendicular magnetic recording medium as recited in claim 17, wherein the grain boundary width between adjacent magnetic grains in the uppermost portion of the region R3 is greater than the grain boundary width between adjacent magnetic grains in the lowermost portion of the region R3.

19. The perpendicular magnetic recording medium as recited in claim 9, wherein a thickness of the fourth plurality of magnetic grains in direction perpendicular to a plane of formation of the region R4 is equal to a thickness of the region R4 in a direction perpendicular to the plane of formation of the region R4.

20. The perpendicular magnetic recording medium as recited in claim 19, wherein each interface between adjacent magnetic grains and grain boundaries in the region R4 is characterized as having a constant slope that extends throughout an entirety of the thickness of the region R4 from a lowermost portion of the region R4 to an uppermost portion of the region R4.

21. The perpendicular magnetic recording medium as recited in claim 20, wherein the grain boundary width between adjacent magnetic grains in the uppermost portion of the region R4 is less than the grain boundary width between adjacent magnetic grains in the lowermost portion of the region R4.

22. The perpendicular magnetic recording medium as recited in claim 9, wherein the fourth plurality of magnetic grains in region R4 are physically characterized by growth directly on the third plurality of magnetic grains in the region R3, the third plurality of magnetic grains in the region R3 being physically characterized by growth directly on the second plurality of magnetic grains in the region R2, the second plurality of magnetic grains in the region R2 being physically characterized by growth directly on the first plurality of magnetic grains in the region R1.

23. The perpendicular magnetic recording medium as recited in claim 1, wherein the oxide recording layer further includes:
   a first recording layer, the first recording layer including the region R1;
   a second recording layer, the second recording layer including the region R2;
   a third recording layer, the third recording layer including the region R3; and
   a fourth recording layer, the fourth recording layer including the region R4,
   wherein an oxide concentration of the first recording layer is greater than an oxide concentration of the second recording layer,
   wherein an oxide concentration of the third recording layer is greater than an oxide concentration of the fourth recording layer, and
   wherein the oxide concentration of the third recording layer is greater than the oxide concentration of the second recording layer.

* * * * *